United States Patent
Hiramoto et al.

(10) Patent No.: US 8,330,409 B2
(45) Date of Patent: Dec. 11, 2012

(54) DRIVE UNIT FOR ROTATING ELECTRICAL MACHINE

(75) Inventors: Kenji Hiramoto, Owariasahi (JP); Hideo Nakai, Nisshin (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 329 days.

(21) Appl. No.: 12/659,525

(22) Filed: Mar. 11, 2010

(65) Prior Publication Data

US 2010/0237822 A1  Sep. 23, 2010

(30) Foreign Application Priority Data

Mar. 17, 2009  (JP) .................................. 2009-064155

(51) Int. Cl.
*H02P 23/00* (2006.01)
(52) U.S. Cl. ...................................................... 318/818
(58) Field of Classification Search .................. 318/268; 310/165
See application file for complete search history.

(56) References Cited

U.S. PATENT DOCUMENTS

| | | | |
|---|---|---|---|
| 5,012,148 A * | 4/1991 | Vithayathil | 310/165 |
| 5,682,073 A | 10/1997 | Mizuno | |
| 6,051,953 A * | 4/2000 | Vithayathil | 318/818 |
| 2002/0074803 A1* | 6/2002 | Kajiura | 290/40 F |
| 2010/0019606 A1 | 1/2010 | Mizutano et al. | |

FOREIGN PATENT DOCUMENTS

| | | |
|---|---|---|
| JP | A 6-351206 | 12/1994 |
| JP | A 2003-97398 | 4/2003 |
| JP | A 2006-521080 | 9/2006 |
| JP | A 2008-187826 | 8/2008 |
| WO | WO 2004/084385 A1 | 9/2004 |

OTHER PUBLICATIONS

Office Action issued in JP 2009-064155, mailed Feb. 22, 2011. (with English-language translation).

* cited by examiner

*Primary Examiner* — Mark Budd
(74) *Attorney, Agent, or Firm* — Oliff & Berridge, PLC

(57) ABSTRACT

An inverter is capable of converting a direct current from a direct current power supply into an alternating current and supplying it to an armature winding. A rectifier circuit is capable of rectifying the current, that has been converted to an alternating current by the inverter, into a direct current and supplying it to the field winding. The amount of the alternating current supplied to the armature winding and the amount of the direct current supplied to the field winding are in a proportional relationship, and implementation of switching control of the inverter controls both the amount of the alternating current supplied to the armature winding and the amount of the direct current supplied to the field winding while this proportional relationship therebetween is maintained.

4 Claims, 19 Drawing Sheets

SECTION A-A

SECTION B-B

SECTION A-A

SECTION B-B

DRIVE UNIT FOR ROTATING ELECTRICAL MACHINE

PRIORITY INFORMATION

This application claims priority to Japanese Patent Application No. 2009-064155, filed on Mar. 17, 2009, which is incorporated herein by reference in its entirety.

BACKGROUND

1. Technical Field

The present invention relates to a drive unit for a rotating electrical machine, and more particularly to an apparatus for supplying electrical current to a field winding and an armature winding of a rotating electrical machine which generates a field flux when a direct current is supplied to the field winding, and which generates a magnetic field that interacts with the field flux when an alternating current is supplied to an armature winding.

2. Related Art

An art related to a rotating electrical machine which generates a field flux when a direct current is supplied to a field winding and which generates a magnetic field that interacts with the field flux when an alternating current is supplied to an armature winding is disclosed in JP 6-351206 A (hereinafter referred to as the patent document 1). In the case of the rotating electrical machine in the patent document 1, as shown in FIGS. 19 and 20, a core 102 of a stator 101, which is an armature, is divided in two in the axial direction. Supposing that a part on one side of the divided core 102 is an N-pole side core 102a and a part on the other side of the core 102 is an S-pole side core 102b, as a matter of convenience, the N-pole side core 102a and the S-pole side core 102b are provided along the axial direction so as to sandwich an annular field winding 105 therebetween. The N-pole side core 102a and the S-pole side core 102b are mechanically and magnetically connected via a stator yoke 104 provided on an outer side thereof. An armature winding 103 is provided so as to bridge over the N-pole side core 102a and the S-pole side core 102b. Further, a core 112 of a rotor 111 is mechanically and magnetically connected to the rotor yoke 114 connected to a shaft 115. The rotor core 112 is in the form of a salient pole and has a partially protruded structure, and forms a salient pole portion 112a at a location other than where permanent magnets 113N and 113S are provided. The salient pole portion 112 may be separated into an N-pole side salient pole portion 112aN corresponding to the N-pole side core 102a and an S-pole side salient pole portion 112aS corresponding to the S-pole side core 102b. The N-pole permanent magnet 113N and the N-pole side salient pole portion 112aN are arranged alternately in the circumferential direction where the rotor 111 opposes the N-pole side core 102a, and the S-pole permanent magnet 113S and the S-pole side salient pole portion 112aS are arranged alternately in the circumferential direction where the rotor 111 opposes the S-pole side core 102b. Further, in the axial direction, the N-pole side salient pole portion 112aN and the S-pole permanent magnet 113S are arranged side by side, and the N-pole permanent magnet 113N and the S-pole side salient pole portion 112aS are arranged side by side.

In the rotating electrical machine according to the patent document 1, the field flux generated by the permanent magnets 113N, 113S passes through a closed magnetic path formed by the N-pole permanent magnet 113N, a gap, the N-pole side core 102a, the stator yoke 104, S-pole side core 102b, a gap, the S-pole permanent magnet 113S, the rotor core 112, the rotor yoke 114, the rotor core 112, and the N-pole permanent magnet 113N, in this order. Further, by supplying a direct current to the field winding 105, as shown in FIG. 19, a direct current flux (field flux) passes through a closed magnetic path formed by the stator yoke 104, the S-pole side core 102b, a gap, the S-pole side salient pole portion 112aS, the rotor core 112, the rotor yoke 114, the rotor core 112, the N-pole side salient pole portion 112aN, a gap, the N-pole side core 102a, and the stator yoke 104, in this order. At this time, the direction of the field flux is controllable by the direction of the direct current, and the amount of the field flux is controllable by the amount of the direct current. In the case where the direction of the field flux created by the direct current passing through the field winding 105 is in the same direction as the field flux created by the permanent magnets 113N, 113S, it is possible to perform field-weakening control since field flux linked to the armature winding 103 decreases compared to the case where direct current is not supplied to the field winding 105. On the other hand, in the case where the direction of the field flux created by the direct current passing through the field winding 105 is in the opposite direction to the field flux created by the permanent magnets 113N, 113S, it is possible to perform field-strengthening control since the field flux linked to the armature winding 103 increases compared to the case where direct current is not supplied to the field winding 105. Also, in the case where unidirectional direct current is supplied to the field winding 105, it is possible to perform field control (control of field flux linked to the armature winding 103) by controlling the amount of direct current supplied to the field winding 105.

FIG. 21 shows a configuration example of a drive circuit for supplying direct current to the field winding 105 in a rotating electrical machine in patent document 1. According to the example of configuration shown in 21, the drive circuit is a bridge-type chopper circuit (DC-DC converter), and it is possible to bidirectionally control the direct current supplied to the field winding 105 by switch controlling switching elements Tr1, Tr4 and switching elements Tr2, Tr3. Further, an inverter is used as a drive circuit for supplying alternating current to the armature winding 103, and it becomes possible to control the alternating current to be supplied to the armature winding 103 by switch controlling the switching element of the inverter.

In patent document 1, switching elements are necessary for both the drive circuit (DC-DC converter) for controlling the direct current to be supplied to the field winding 105 and the drive circuit (inverter) for controlling the alternating current to be supplied to the armature winding 103, respectively. Consequently, the number of switching elements necessary increases, resulting in an increased drive circuit cost.

The present invention has an advantage to realize low cost by reducing the number of switching elements used in controlling the current to be supplied to the field winding and the armature winding of a rotating electrical machine.

SUMMARY

The drive unit for a rotating electrical machine according to the present invention is a drive unit for a rotating electrical machine for supplying electrical current to a field winding and an armature winding of a rotating electrical machine which generates a field flux when a direct current is supplied to the field winding, and which generates a magnetic field that interacts with the field flux when an alternating current is supplied to the armature winding. The drive unit comprises an inverter capable of converting a direct current from a direct current power supply and supplying the alternating current to the armature winding, and a rectifier circuit capable of rectifying the current that has been converted into alternating current by the inverter into a direct current, and supplying the direct current to the field winding.

In one mode of the present invention, it is preferable that the armature winding is a three-phase winding, that the inverter comprises a plurality of switching arms provided corresponding to each phase of the armature winding, each of the plurality of switching arms including a pair of switching elements connected in series between a positive terminal and a negative terminal of the direct current power supply, that the rectifier circuit comprises a plurality of rectifier arms provided corresponding to each phase of the armature winding, each of the plurality of rectifier arms including a pair of rectifier devices connected in series between one end and the other end of the field winding, and that the one end of each phase of the armature winding is connected to a midpoint of switching elements of a corresponding switching arm, and the other end of each phase of the armature winding is connected to a midpoint between rectifier devices of a corresponding rectifier arm.

In one mode of the present invention, it is preferable that the armature winding is a three-phase winding, that the inverter comprises a plurality of switching arms provided corresponding to each phase of the armature winding, each of the plurality of switching arms including a pair of switching elements connected in series between a positive terminal and a negative terminal of the direct current power supply, that the rectifier circuit comprises a plurality of rectifier arms provided corresponding to each phase of the armature winding, each of the plurality of rectifier arms including a pair of rectifier devices connected in series between one end and the other end of the field winding, and that the one end of each phase of the armature winding is connected to a midpoint of switching elements of a corresponding switching arm and to a midpoint of rectifier devices of a corresponding rectifier arm, and the other ends of each phase of the armature winding are connected to each other.

According to the present invention, it is possible to reduce the number of switching elements in controlling the current to be supplied to the field winding and the armature winding of a rotating electrical machine, thereby realizing cost reduction.

DETAILED DESCRIPTION

Hereinafter, an embodiment for carrying out the present invention will be described with reference to the drawings.

Figure 1:
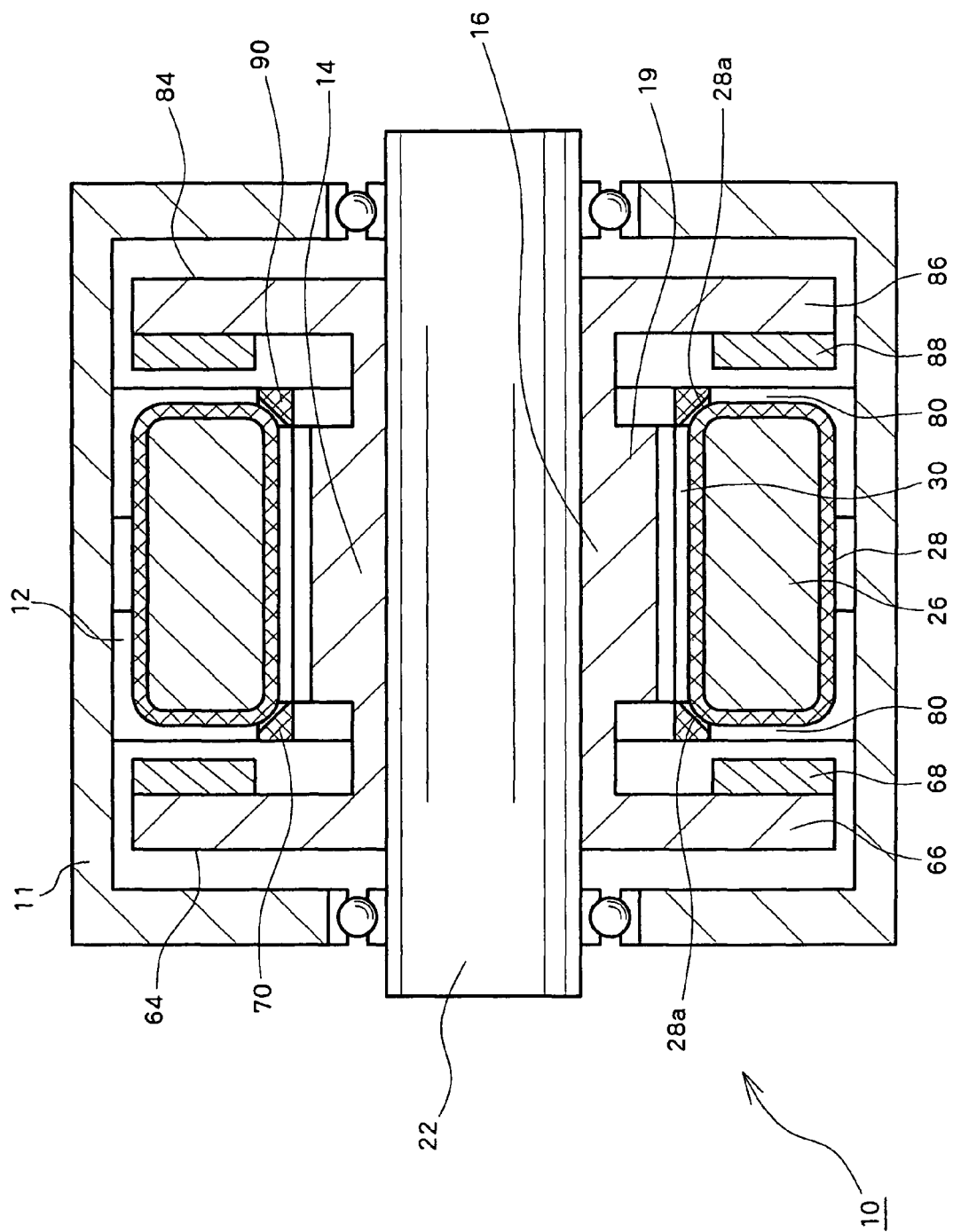
FIG. 1 is a diagram showing an example of configuration of a rotating electrical machine.
Figure 2:
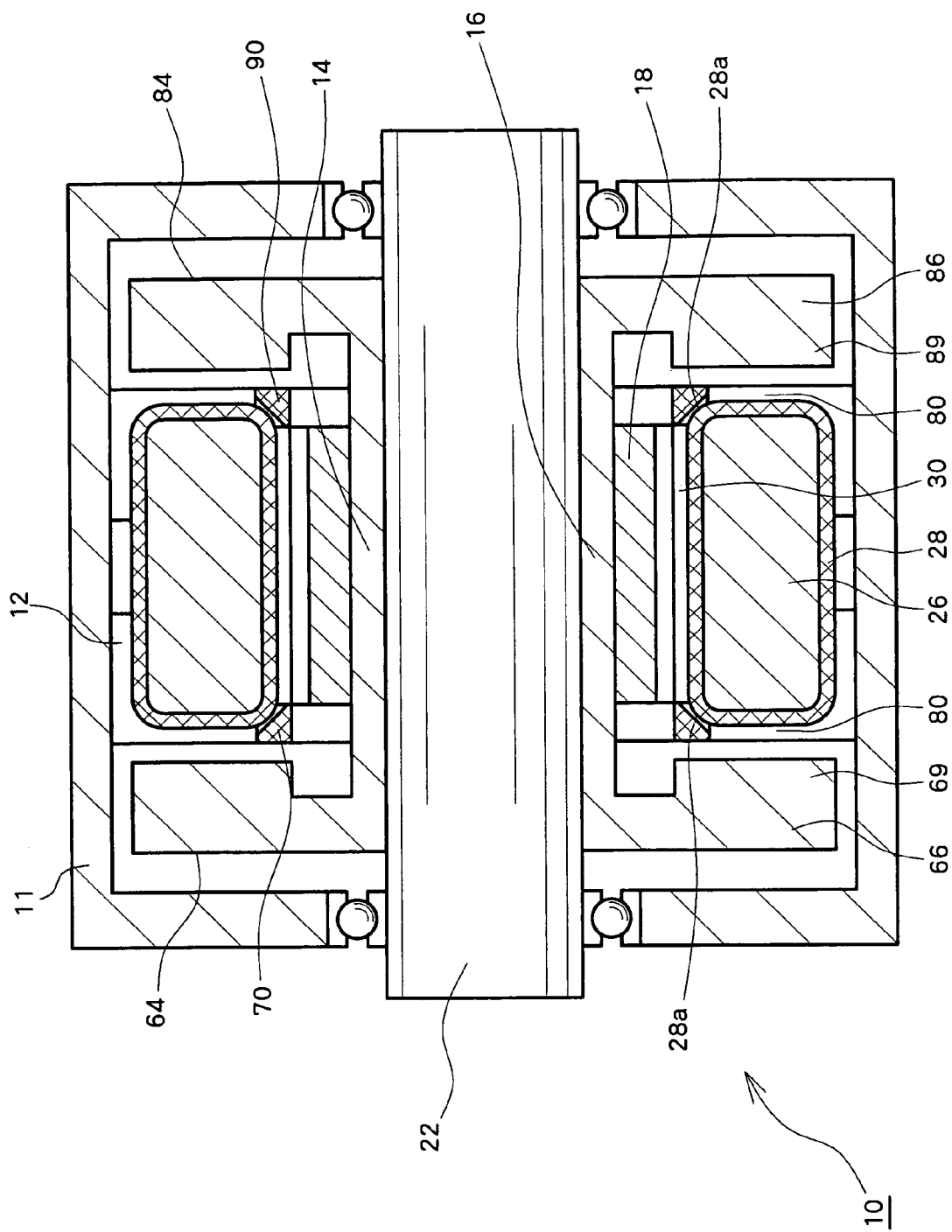
FIG. 2 is a diagram showing an example of configuration of a rotating electrical machine.
Figure 3:
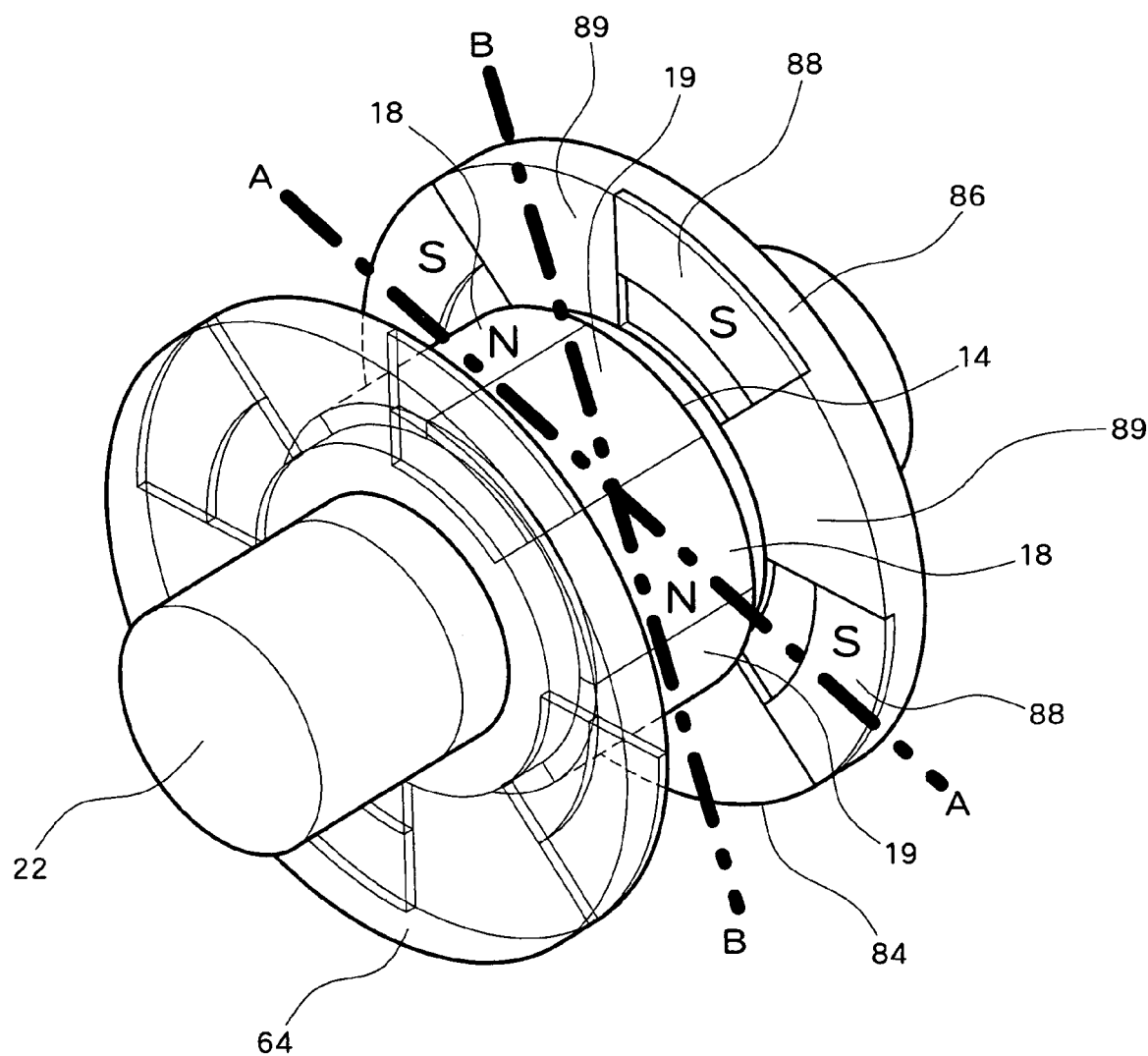
FIG. 3 is a diagram showing an example of configuration of a rotating electrical machine.
Figure 4:
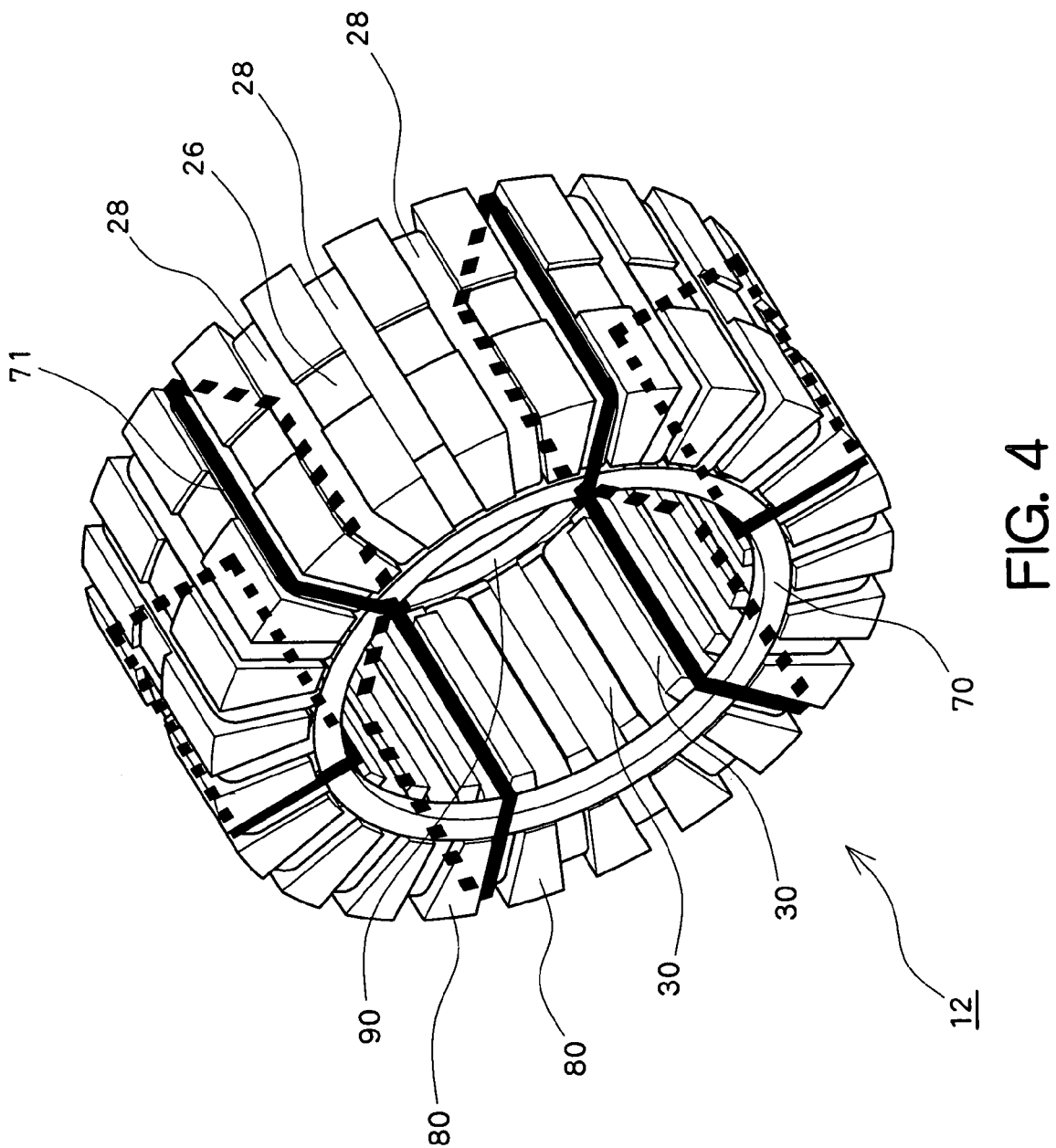
FIG. 4 is a diagram showing an example of configuration of a rotating electrical machine.
Figure 5:
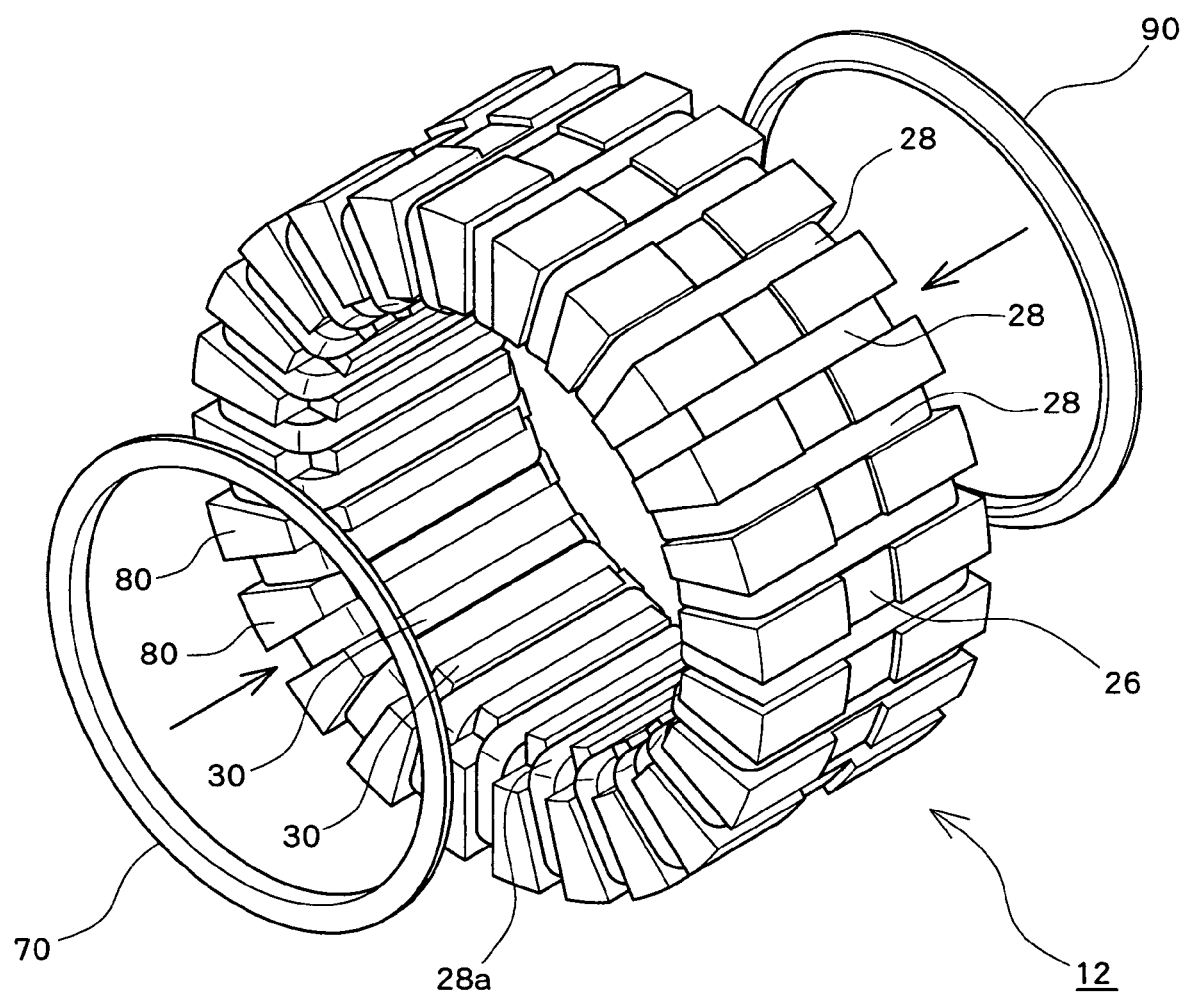
FIG. 5 is a diagram showing an example of configuration of a rotating electrical machine.

First, an example of configuration of a rotating electrical machine 10 having a field winding and an armature winding to which current from a drive unit according to an embodiment of the present invention is supplied will be described with reference to FIGS. 1 through 5. FIGS. 1 and 2 are sectional views of schematic internal configuration of a rotor and a stator as seen from the direction orthogonal to a rotation axis 22. FIG. 3 is a perspective view of a rotor configuration, and FIGS. 4 and 5 are perspective views of stator configuration. FIG. 1 is a sectional view taken at a position corresponding to the A-A section in FIG. 3, and FIG. 2 is a sectional view taken at a position corresponding to the B-B section in FIG. 3. The rotating electrical machine 10 comprises a stator 12 fixed to a casing 11 and a rotor disposed to oppose the stator 12 and rotatable with respect to the stator 12. The rotor has a radial rotor 14 arranged to oppose the stator 12 in the radial direction which is orthogonal to the rotor rotation axis (rotation axis 22) (hereafter simply referred to as the radial direction) and two axial rotors 64, 84 arranged to oppose the stator 12 in the direction parallel to the rotor rotation axis (rotation axis 22) (hereafter referred to as the direction of rotation axis) and mechanically and magnetically connected to the radial rotor 14. Both the radial rotor 14 and the axial rotors 64, 84 are mechanically connected to the nonmagnetic rotation axis 22, and the radial rotor 14 and the axial rotors 64, 84 rotate integrally with the rotation axis 22. In the examples shown in FIGS. 1 through 5, the radial rotor 14 is arranged radially inward of the stator 12 and it opposes the stator by a predetermined clearance (air gap) from the inner peripheral surface of the stator (radial surface). Further, two axial rotors 64, 84 are arranged outside the stator 12 in the rotation axis direction and oppose the stator 12 by a predetermined clearance from both side surfaces (axial surface) of the stator 12.

The stator 12 includes an annular core portion 26 and an armature winding 28 with a plurality of phases (for example, three phases) toroidally wound around this annular core portion 26. The stator 12 has a plurality of radial teeth 30 arranged along the circumferential direction around the rotor rotation axis (hereafter simply referred to as the circumferential direction) at intervals (at equal intervals) and protruding in the radial direction from the inner peripheral surface of the annular core, portion 26 (radially inward) toward the radial rotor 14, and a slot is formed between each radial tooth 30. Further, the stator 12 has a plurality of axial teeth 80 (in the quantity equivalent to the radial teeth 30) arranged along the circumferential direction at intervals (at equal intervals) and protruding in the rotation axis direction (outward of the rotation axis direction) from both side surfaces of the annular core portion 26 toward the axial rotor 64, and a slot is formed between each axial teeth 80. The radial teeth 30 and the axial teeth 80 are arranged such that they are not displaced with respect to one another in the circumferential direction, and the slots between the radial teeth 30 and the slots between the axial teeth 80 are also arranged such that they are not displaced with respect to one another in the circumferential direction. The three-phase armature winding 28 is toroidally wound through the slot between the radial teeth 30 and the slot between the axial teeth 80 (for example, by distributed winding). Here, the annular core portion 26, the radial teeth 30, and the axial teeth 80, in other words, the core portions of the stator 12, may be formed by, for example, three-dimensional isotropic magnetic material such as power magnetic core material made by compacting powder which is made by coating the surface of ferromagnetic particles of iron and the like with nonconductive film.

The radial rotor 14 includes a substantially cylindrical radial core 16 and a plurality of radial permanent magnets 18 arranged on the outer peripheral portion of the radial core 16 opposing the stator 12 (radial teeth 30) in the radial direction. On the outer peripheral portion of the radial core 16, a plurality of (a quantity equivalent to the number of radial permanent magnets 18) radial salient pole portion 19 protruding radially outward toward the stator 12 (radial teeth 30) are arranged along the circumferential direction at intervals (at equal intervals). Each radial salient pole portion 19 opposes the stator 12 (radial teeth 30) in the radial direction. A plurality of radial permanent magnets 18 are arranged along the circumferential direction at intervals (at equal intervals), and the radial permanent magnets 18 are arranged between the respective radial salient pole portions 19 in the circumferential direction. That is, each radial permanent magnet 18 is displaced in the circumferential direction with respect to the radial salient pole portion 19, and the radial permanent magnets 18 and the radial salient pole portions 19 are alternately arranged in the circumferential direction. The direction of magnetization of each radial permanent magnet 18 is the same, and the surface (magnetic surface opposing the stator 12) of each radial permanent magnet 18 is magnetized to the same polarity (for example, the N-pole).

Figure 6:
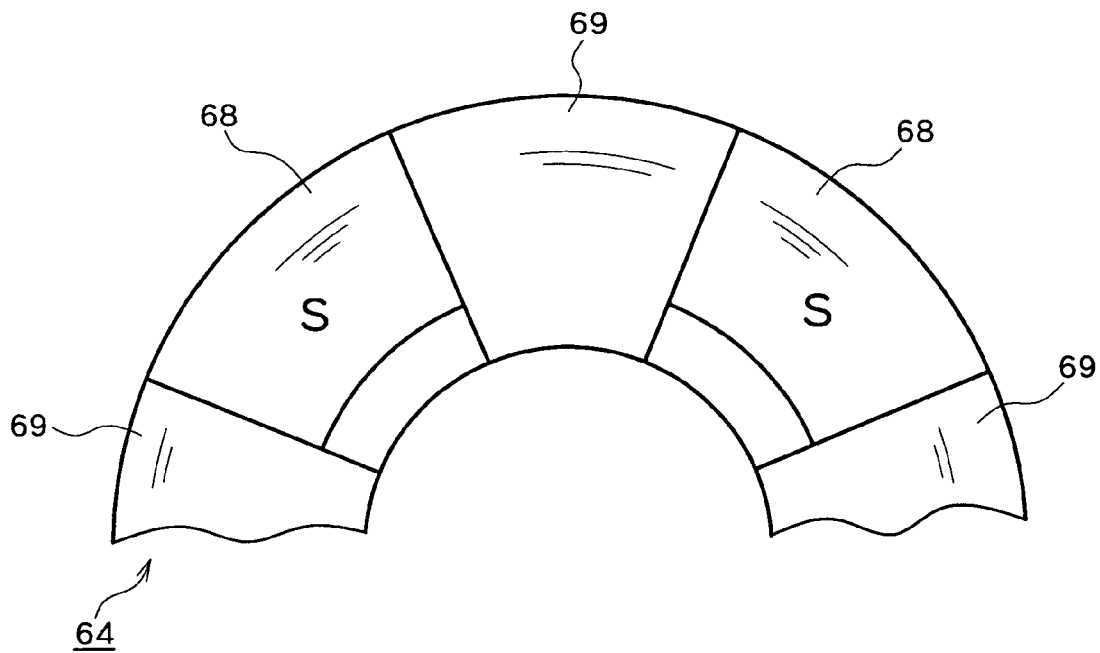
FIG. 6 is a diagram showing an example of configuration of a rotating electrical machine.

The axial rotor 64 includes a substantially annular axial core 66 and a plurality of axial permanent magnets 68 arranged on the side surface of the axial core 66 opposing the stator 12 (axial teeth 80) in the rotation axis direction. The axial core 66 is mechanically and magnetically connected to the radial core 16. On the side surface of the axial core 66, a plurality of (a quantity equivalent to the number of axial permanent magnets 68) axial salient pole portion 69 protruding in the rotation axis direction (inner rotation axis direction) toward the stator 12 (axial teeth 80) are arranged along the circumferential direction at intervals (at equal intervals). Each axial salient pole portion 69 opposes the stator 12 (axial teeth 80) in the rotation axis direction. A plurality of axial permanent magnets 68 are arranged along the circumferential direction at intervals (at equal intervals), and placed between the respective axial salient poles 69 in the circumferential direction. That is, as shown in FIG. 6, each axial permanent magnet 68 is displaced in the circumferential direction with respect to the axial salient pole portion 69, and the axial permanent magnets 68 and the axial salient pole portions 69 are alternately arranged in the circumferential direction. The direction of magnetization of each axial permanent magnet 68 is the same, and the surface (magnetic surface opposing the stator 12) of each axial permanent magnet 68 is magnetized to the same polarity (for example the S-pole).

Figure 7:
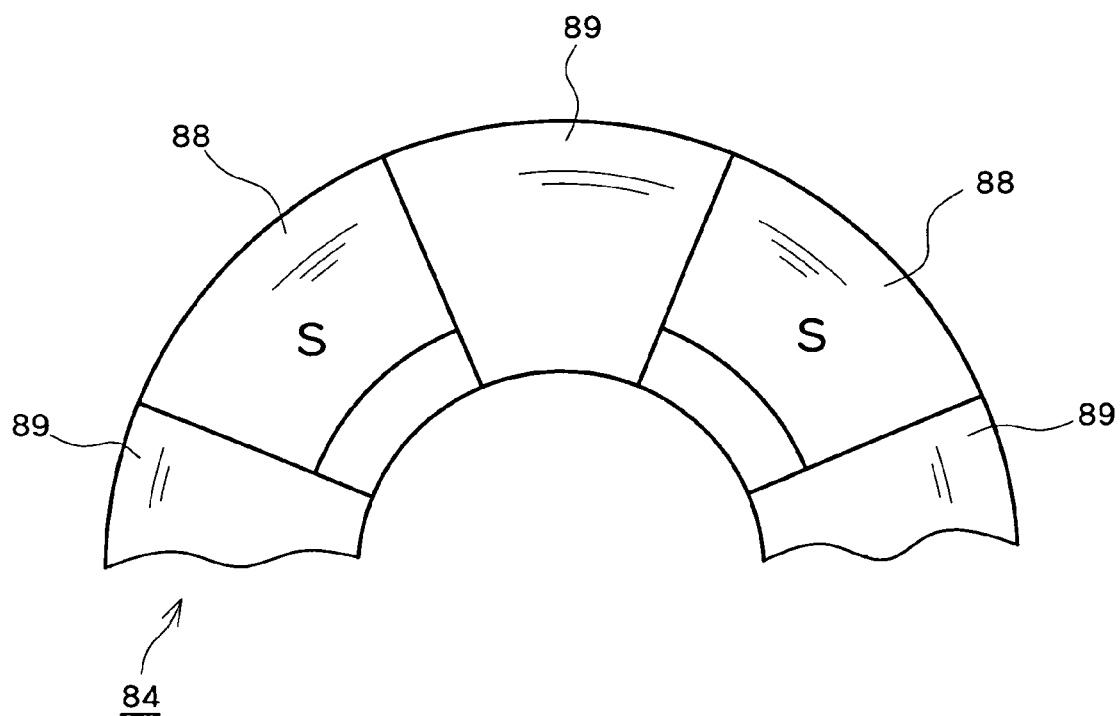
FIG. 7 is a diagram showing an example of configuration of a rotating electrical machine.

Similarly, the axial rotor 84 includes a substantially annular axial core 86 and a plurality of axial permanent magnets 88 arranged on the side surface of the axial core 86 opposing the stator 12 (axial teeth 80) in the rotation axis direction. The axial core 86 is mechanically and magnetically connected to the radial core 16. On the side surface of the axial core 86, a plurality of (a quantity equivalent to the number of axial permanent magnets 88) axial salient pole portions 89 protruding in the rotation axis direction (inward of the rotation axis direction) toward the stator 12 (axial teeth 80) are arranged along the circumferential direction at intervals (at equal intervals). Each axial salient pole portion 89 opposes the stator 12 (axial teeth 80) in the rotation axis direction. A plurality of axial permanent magnets 88 are arranged along the circumferential direction at intervals (at equal intervals), and placed between the respective axial salient poles 89 in the circumferential direction. That is, as shown in FIG. 7, each axial permanent magnet 88 is displaced in the circumferential direction with respect to the axial salient pole portion 89, and the axial permanent magnets 88 and the axial salient pole portions 89 are alternately arranged in the circumferential direction. The direction of magnetization of each axial permanent magnet 88 is the same, and the surface (magnetic surface opposing the stator 12) of each axial permanent magnet 68 is magnetized to the same polarity (the S-pole, for example).

The axial permanent magnets 88 are provided in the same quantity as the axial permanent magnets 68, and the axial salient pole portions 89 are provided in the same quantity as the axial salient pole portions 69. The axial permanent magnet 88 is arranged such that it is not displaced in the circumferential direction with respect to the axial permanent magnet 68, and opposes the axial permanent magnet 68 in the rotation axis direction via the stator 12. The axial salient pole portion 89 is also arranged such that it is not displaced in the circumferential direction with respect to the axial salient pole portion 69, and opposes the axial salient pole portion 69 in the rotation axis direction via the stator 12. The surface (magnetic pole surface opposing the stator 12) of each axial permanent magnet 88 is magnetized to the same polarity (for example, the S-pole) as the surface (magnetic pole surface opposing the stator 12) of each axial permanent magnet 68.

Further, the radial permanent magnets 18 are provided in the same quantity as the axial permanent magnets 68 (axial permanent magnets 88), and the radial salient pole portions 19 are provided in the same quantity as the axial salient pole protrusions 69 (axial salient pole portions 89). The axial permanent magnets 68, 88 are arranged such that they are displaced with respect to the radial permanent magnet 18 in the circumferential direction, and the axial salient pole portions 69, 89 are displaced with respect to the radial salient pole portion 19 in the circumferential direction. The axial permanent magnets 68, 88 and the radial salient pole portions 19 are arranged such that they are not displaced with respect to one another in the circumferential direction, and the axial salient portions 69, 89 and the radial permanent magnets 18 are arranged such that they are not displaced with respect to one another in the circumferential direction. The surface (magnetic pole surface opposing the stator 12) of each axial permanent magnet 68, 88 is magnetized to a polarity opposite to the polarity of the surface (magnetic pole surface opposing the stator 12) of each radial permanent magnet 18. In the examples shown in FIGS. 3, 6, and 7, the surface of each radial permanent magnet 18 is magnetized to the N-pole, and the surface of each axial permanent magnets 28, 88 is magnetized to the S-pole. It is also possible for the surface of each radial permanent magnet 18 to be magnetized to the S-pole and the surface of each axial permanent magnet 68, 88 to be magnetized to the N-pole.

The radial teeth 30 and the axial teeth 80 are sequentially magnetized by supplying alternating current of a plurality of phases (three phases) to the armature winding 28 for a plurality of phases (three phases), thereby creating a rotating field that rotates in the circumferential direction in the stator 12. The rotating field generated in the stator 12 acts on the radial rotor 14 and the axial rotors 64, 84 from the radial teeth 30 and the axial teeth 80, respectively, and the magnetic field (field flux) generated by the radial permanent magnets 18 and the axial permanent magnets 68, 88 interacts with this rotating field to yield attraction and repulsion. This electromagnetic interaction (attraction and repulsion) between the rotating field of the radial teeth 30 and the axial teeth 80 and the field flux of the radial permanent magnet 18 and the axial permanent magnets 68, 88 makes it possible to generate torque (magnet torque) in the radial rotor 14 and the axial rotors 64, 84. Accordingly, it is possible to make the rotating electrical machine 10 function as a motor that uses the electric power supplied to the armature winding 28 to generate power (mechanical power) in the radial rotor 14 and the axial rotors 64, 84. On the other hand, it is also possible to make the rotating electrical machine 10 function as a generator that generates electric power in the armature winding 28 using power of the radial rotor 14 and the axial rotors 64, 84.

Further, field windings 70, 90 are provided in the stator 12 to control the field flux that interacts with the rotating field of the stator 12. The respective field windings 70, 90 are wound annularly along the circumferential direction. The position where the field winding 70 passes (where it is wound) is closer to the radial rotor 14 (the radial permanent magnet 18 and the radial salient pole portion 19) than the annular core portion 26 in the radial direction, and it is closer to the axial rotor 64 (the axial permanent magnet 68 and the axial salient pole portion 69) than the annular core portion 26 in the rotation axis direction. The position where the field winding 90 passes (where it is wound) is closer to the radial rotor 14 (the radial permanent magnet 18 and the radial salient pole portion 19) than the annular core portion 26 in the radial direction, and it is closer to the axial rotor 84 (the axial permanent magnet 88 and the axial salient pole portion 89) than the annular core portion 26 in the rotation axis direction. In the examples shown in FIGS. 1 through 5, the field windings 70, 90 are arranged in proximity to each radial tooth 30, each axial tooth 80, and each armature winding 28 such that they are more to the radial rotor 14 side (inside) than each axial tooth 80 in the radial direction, and such that they are more to the axial rotor 64, 84 side (outside) with respect to each radial tooth 30 in the rotation axis direction. The field windings 70, 90 are electrically isolated from the armature windings 28 by an isolator. Further, a convex curved surface 28a is formed at a portion in proximity to the field windings 70, 90 on the outer periphery surface of each armature winding 28. The outside diameter of the outer peripheral surface of the field winding 70 located in proximity to the convex curved surface 28a of each armature winding 28 gradually decreases as it approaches the annular core portion 26 side from the axial rotor 64 side in the rotation axis direction (from outside to inside), and the outside diameter of the outer peripheral surface of the field winding 90 located in proximity to the convex curved surface 28a of each armature winding 28 gradually decreases as it approaches the annular core portion 26 side from the axial rotor 84 side in the rotation axis direction. The field windings 70, 90 may be fixed to the stator 12, for example, as shown in FIG. 4, by tying them to the stator 12 with fiber 71 and the like over the armature winding 28, or by molding the entire stator using resin and the like.

In the examples (wherein the surface of the radial permanent magnet 18 is magnetized to the N-pole and the surfaces of the axial permanent magnets 68, 88 are magnetized to the S-pole) shown in FIGS. 3, 6, and 7, the field fluxes generated by the radial permanent magnet 18 and the axial permanent magnets 68, 88 pass through a closed magnetic path in the order of the radial permanent magnet 18, an air gap, the radial teeth 30, the annular core portion 26, the axial teeth 80, an air gap, the axial permanent magnets 68, 88, the axial cores 66, 86, the radial core 16, and the radial permanent magnet 18 (the direction of the field flux will be opposite in the case where the surface of the radial permanent magnet 18 is magnetized to the S-pole and the surface of the axial permanent magnets 68, 88 are magnetized to the N-pole). Further, by supplying a direct current to the field windings 70, 90, a field flux passing through a closed magnetic path in the order of the radial salient pole portion 19, the radial core 16, the axial cores 66, 86, the axial salient pole portions 69, 89, an air gap, the axial teeth 80, the annular core portion 26, the radial teeth 30, an air gap, and the radial salient pole portion 19 is generated, and this field flux interacts with the rotating field that is generated in the stator 12 by supplying alternating current to the armature winding 28. At that time, the surface (surface opposing the stator 12) of each radial salient pole portions 19 is magnetized to the same pole, and the surfaces (surfaces opposing the stator 12) of the respective axial salient pole portions 69, 89 are magnetized to the same pole. However, the surface of each axial salient pole portion 69, 89 is magnetized to the opposite polarity as the surface of each salient radial pole portion 19. The amount of the field flux generated the field windings 70, 90 is controllable by the amount of direct current supplied to the field windings 70, 90.

Figure 8:
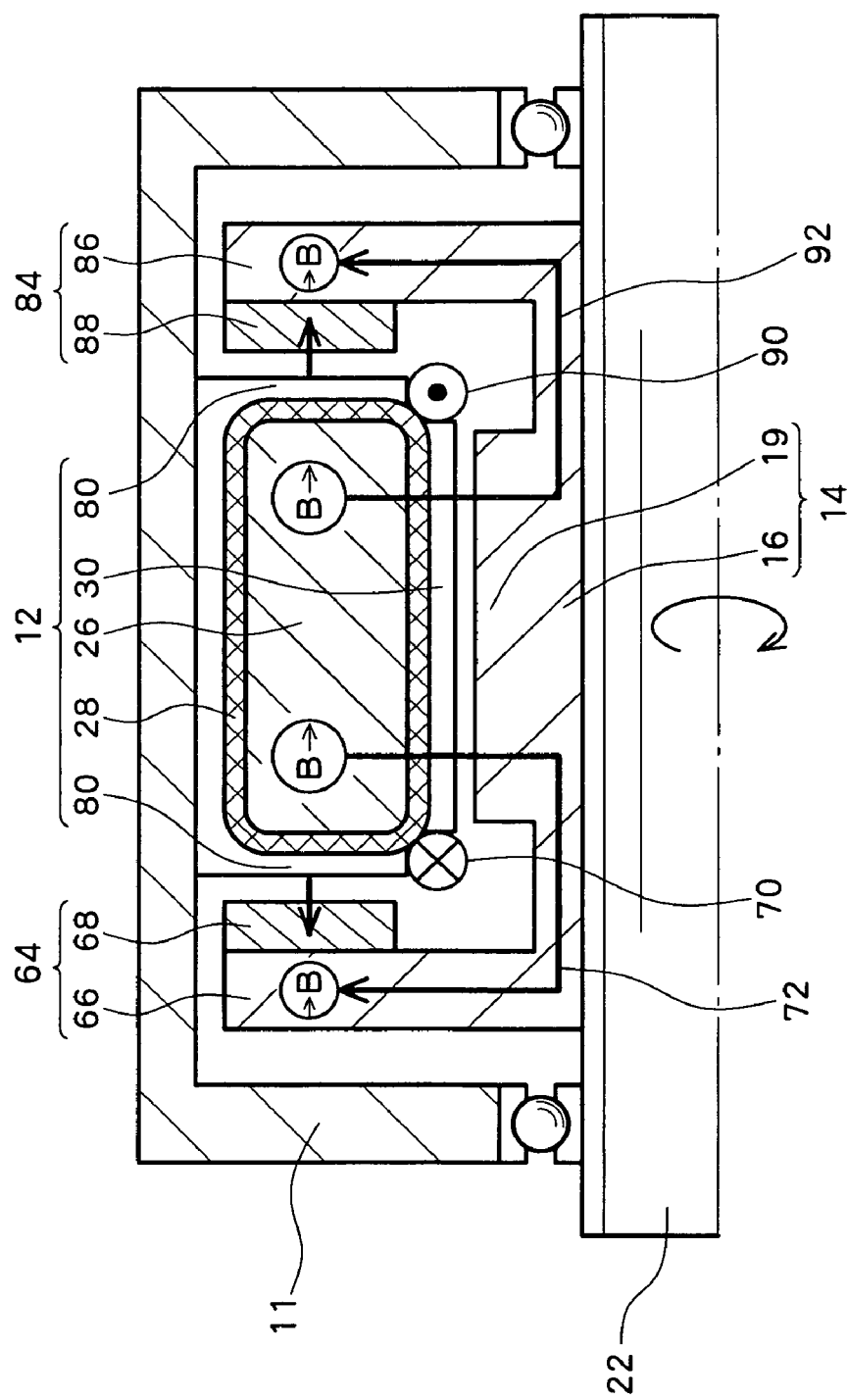
FIG. 8 is a diagram explaining field control in a rotating electrical machine.
Figure 9:
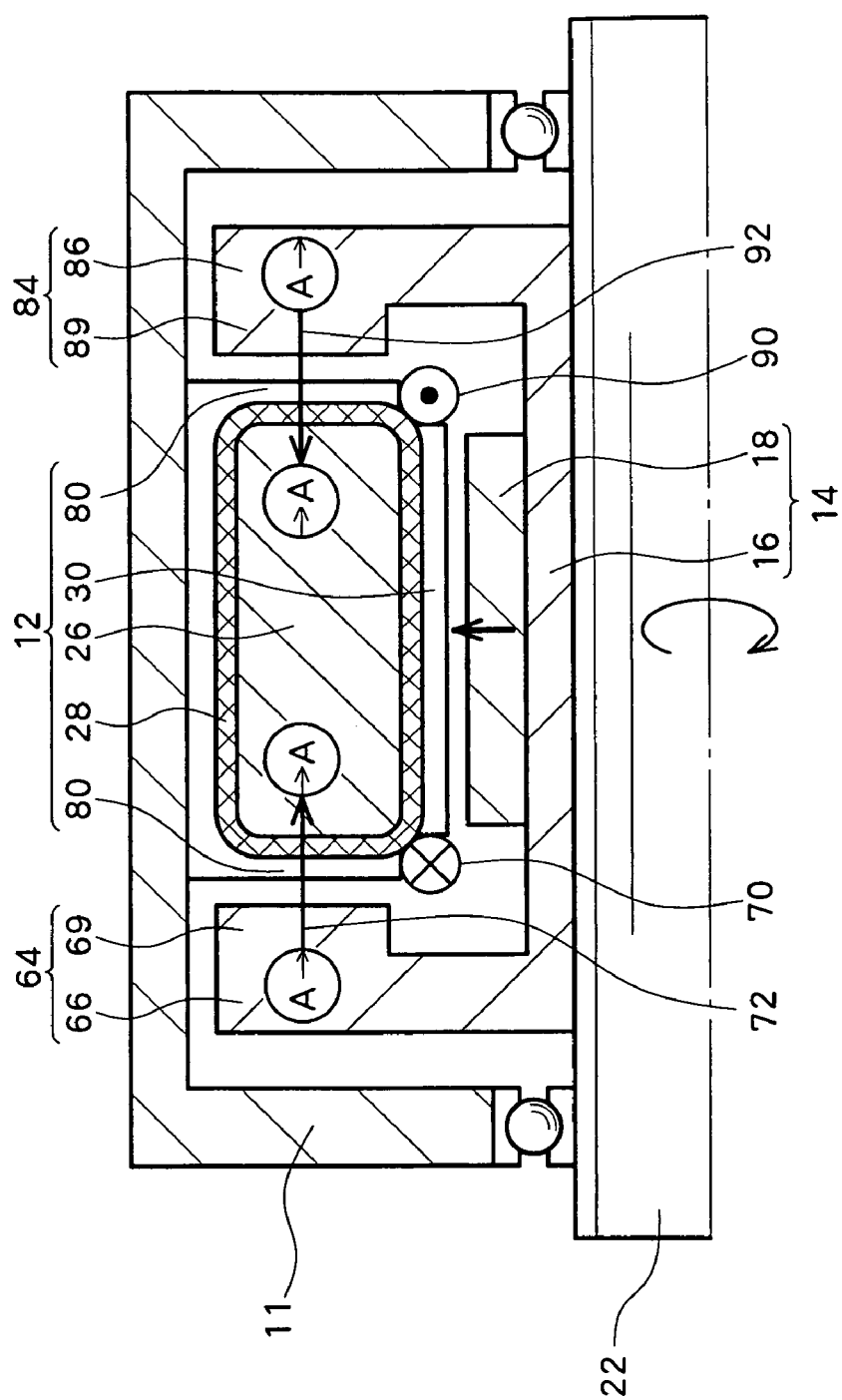
FIG. 9 is a diagram explaining field control in a rotating electrical machine.

As shown in FIGS. 8 and 9, by supplying a direct current (field current) to the field windings 70, 90 in a direction such that the surface of each radial salient pole portion 19 is magnetized to an opposite polarity (for example, the S-pole) to that of the surface of each radial permanent magnet 18 and such that the surface of each axial salient pole portion 69, 89 is magnetized to an opposite polarity (for example, the N-pole) to that of the surface of each axial permanent magnet 68, 88, the field fluxes 72, 92 generated the field windings 70, 90 pass through a closed magnetic path in the order of the axial salient pole portions 69, 89, an air gap, the axial teeth 80, the annular core portion 26, the radial teeth 30, an air gap, the radial salient pole portion 19, the radial core 16, the axial cores 66, 86, and the axial salient pole portions 69, 89. In FIGS. 8 and 9, a portion denoted by a solid black circle in a white circle represents a case where current flows in a forward direction relative to the drawing surface, and a portion denoted by an X in a white circle represents a case where current flows in a backward direction relative to the drawing surface (the same applies to drawings thereafter). In FIGS. 8 and 9, a portion denoted by an →A in a white circle represents a case where a flux flows to a section A-A (FIG. 8), and a portion denoted by an A→ in a white circle represents a case where a flux flows from the section A-A (FIG. 8), while a portion denoted by a →B in a white circle represents a case where a flux flows to a section B-B (FIG. 9), and a portion denoted by a B→ in a white circle represents a case where a flux flows from the section B-B (FIG. 9) (the same applies to drawings thereafter). In this case, the field fluxes 72, 92 generated by the field windings 70, 90 and the field flux generated by the radial permanent magnet 18 and the axial permanent magnets 68, 88 are directed in a same direction when they pass through the annular core portion 26 in the circumferential direction. Accordingly, it is possible to increase the field flux linked to the armature winding 28 by increasing the amount of direct current supplied to the field windings 70, 90, and implementation of field strengthening control thereby becomes possible. On the other hand, it is possible to decrease the field flux linked to the armature winding 28 by reducing the amount of direct current supplied to the field windings 70, 90, and implementation of field weakening control thereby becomes possible. In this way, it is possible to control the field flux linked to the armature winding 28 by controlling the direct current to be supplied to the field windings 70, 90 to further control the field flux passing through the radial rotor 14 (radial salient pole portion 19) and the axial rotors 64, 84 (axial salient pole portions 69, 89) and the annular core portion 26, whereby field control becomes possible.

Figure 10:
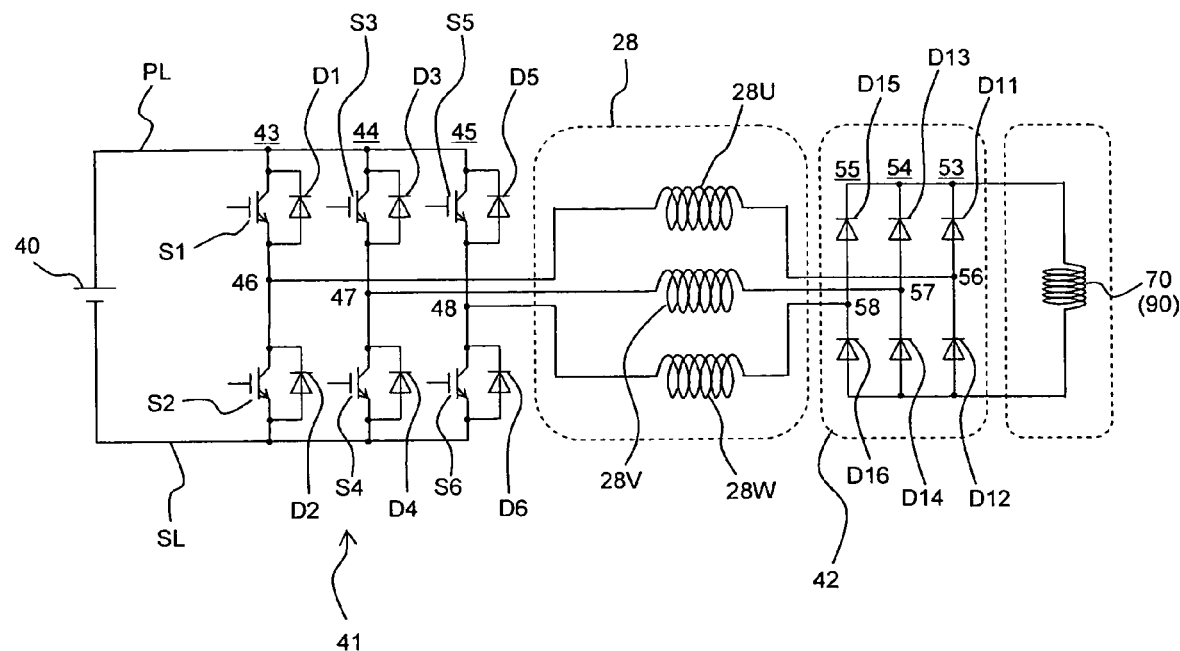
FIG. 10 is a diagram illustrating a schematic configuration of a dive unit for a rotating electrical machine according to an embodiment of the present invention.

Now, the drive unit for a rotating electrical machine according to the present embodiment, that is, the configuration of a drive unit that supplies current to the field windings 70, 90 and the armature winding 28 of the rotating electrical machine 10, will be described with reference to FIG. 10. The drive unit for a rotating electrical machine according to the present embodiment is provided with an inverter 41 capable of converting a direct current from a direct current power supply 40 into an alternating current and supplying it to the armature winding 28, and a rectifier circuit 42 capable of rectifying the alternating current, that has been converted by the inverter 41 and supplied to the armature winding 28, into a direct current and supplying it to the field windings 70, 90.

The inverter 41 has a plurality of (three in the case of FIG. 10) switching arms 43, 44, 45 connected in parallel to each other between a positive line PL and a negative line SL of the direct current power supply 40 and provided so as to correspond to each phase 28U, 28V, 28W of the armature winding 28. In the switching arm 43, a pair of switching elements S1, S2 are connected in series between the positive line PL and the negative line SL of the direct current power supply 40. Further, the switching arm 43 is provided with a pair of diodes (rectifier device) D1, D2 connected anti-parallel to the respective switching elements S1, S2. Similarly, in the switching arm 44, a pair of switching elements S3, S4 are connected in series between the positive line PL and the negative line SL of the direct current power supply 40, and a pair of diodes D3, D4 are further connected anti-parallel to the respective switching elements S3, S4. In the switching arm 45, a pair of switching elements S5, S6 are connected in series between the positive line PL and the negative line SL of the direct current power supply 40, and a pair of diodes D5, D6 are further connected anti-parallel to the respective switching elements S5, S6. One end of each phase 28 U, 28V, 28W of the armature winding 28 is connected to midpoints 46, 47, 48 between the switching elements of corresponding switching arms 43, 44, 45. The inverter 41 is capable of converting the direct current power from the direct current power supply 40 into a three-phase alternating current and supplying it to the armature windings 28U, 28V, 28W by the switching operation that repeats the operation of turning on and off the switching elements S1 through S6. Further, the inverter 41 is also capable of a conversion in a direction such that the three-phase alternating current power of the armature windings 28U, 28V, 28W is converted into a direct current and recovered by a direct current power supply 40.

The rectifier circuit 42 has a plurality of (three in FIG. 10) rectifier arms 53, 54, 55 that are connected to each other in parallel between one end and the other end of the field windings 70, 90, and provided corresponding to each phase 28U, 28V, 28W of the armature winding 28. In the rectifier arm 53, a pair of diodes (rectifier device) D11, D12 are connected in series between one end and the other end of the field windings 70, 90. Similarly, in the rectifier arm 54, a pair of diodes D13, D14 are connected in series between one end and the other end of the field windings 70, 90, and in the rectifier arm 55, a pair of diodes D15, 16 are connected in series between one end and the other end of the field windings 70, 90. The other ends of each phase 28U, 28V, 28W of the armature winding 28 are connected respectively to midpoints 56, 57, 58 of the diodes of corresponding rectifier arms 53, 54, 55. The rectifier circuit 42 is capable of converting the three-phase alternating current, that had been converted into an alternating current by the inverter 41 and supplied to the armature winding 28, into a direct current by rectifying the three-phase alternating current using the diodes (rectifier device) D11 through D16 and supplying it to the field windings 70, 90. Thus, in the present embodiment, a rectifier circuit 42 is connected at a neutral point portion of the armature windings 28U, 28V, 28W in three phases to supply a direct current to the field windings 70, 90 from the armature windings 28U, 28V, 28W via the rectifier circuit 42.

In the present embodiment, switching operations of the switching elements S1 through S6 of the inverter 41 cause the direct current from the direct current power supply 40 to be converted into an alternating current which is then supplied to the armature windings 28U, 28V, 28W. Further, the alternating current supplied to the armature windings 28U, 28V, 28W is rectified into a direct current by the diodes D11 through D16 of the rectifier circuit 42 to be also supplied to the field windings 70, 90. The amount (amplitude) of the alternating current supplied to the armature windings 28U, 28V, 28W and the amount of the direct current supplied to the field windings 70, 90 are in a proportional relationship, which means that an increase in alternating current supplied to the armature windings 28U, 28V, 28W results in an increase in direct current supplied to the field windings 70, 90. Both the amount of the alternating current supplied to the armature windings 28U, 28V, 28W and the amount of the direct current supplied to the field windings 70, 90 are controlled by the switching control of the switching elements S1 through S6 while this proportional relationship is maintained. Here, the proportion between the amount of the alternating current supplied to the armature windings 28U, 28V, 28W and the amount of the field flux is adjustable by adjusting the number of turns (windings) of the field windings 70, 90.

Figure 11:
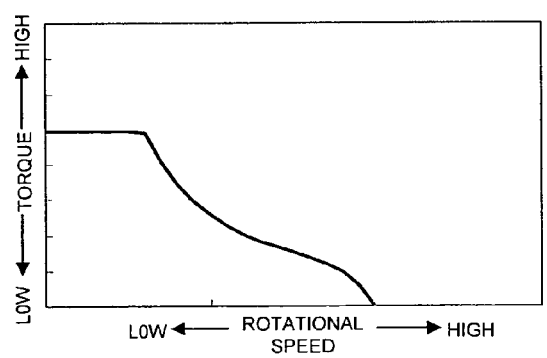
FIG. 11 is a diagram illustrating the relationship between rotational speed and torque of a rotating electrical machine.

The characteristic between rotational speed and torque of the rotating electrical machine 10 is preferably such that the high torque is obtained at low rotational speed, as shown in FIG. 11. Also, it is preferable that the high-rotational speed operating range of the rotating electrical machine 10 is expanded by reducing induced voltage of the armature winding 28. To that end, it is preferable to increase the field current (direct current) supplied to the field windings 70, 90 at low rotational speed to increase torque and to reduce the field current at high rotational speed to reduce the induced voltage. Similarly, it is preferable to increase the alternating current supplied to the armature winding 28 at low rotational speed and reduce the alternating current at high rotational speed. That is, the amount of the field current supplied to the field windings 70, 90 and the amount of the alternating current supplied to the armature winding 28 are requested in a proportional relationship.

In contrast, in the present embodiment, it is possible to increase the amount of direct current supplied to the field windings 70, 90 by implementing switching control of the inverter 41 (switching elements S1 through S6) so as to increase the amount of alternating current supplied to the armature windings 28U, 28V, 28W when the rotational speed of the rotor (the radial rotor 14 and the axial rotors 64, 84) is low, whereby it becomes possible to increase the field flux linked to the armature winding 28 (it is possible to implement the field strengthening control). As a result, it is possible to increase the torque of the rotor when the rotational speed of the rotor is low. On the other hand, it is possible to decrease the direct current supplied to the field windings 70, 90 by implementing switching control of the inverter 41 so as to decrease the amount of the alternating current supplied to the armature windings 28U, 28V, 28W when the rotational speed of the rotor is high, and therefore to decrease the field flux linked to the armature winding 28 (it is possible to implement the field weakening control). Consequently, induced voltage of the armature winding 28 may be reduced when the rotational speed of the rotor is high, whereby the operating range of the rotating electrical machine 10 is expanded on the high-speed side. Therefore, controllability of the rotating electrical machine 10 may be improved by the present embodiment.

Further, in the present embodiment, it is possible to control both the amount of the field current supplied to the field windings 70, 90 and the amount of the alternating current supplied to the armature winding 28 while maintaining a proportional relationship therebetween, by merely implementing switching control of the inverter 41 (switching elements S1 through S6). Consequently, it becomes unnecessary to provide a DC-DC converter including a switching element for controlling the field current supplied to the field windings 70, 90. As a result, the number of switching elements may be reduced, thereby realizing cost reduction and size reduction of the drive unit.

Figure 12:
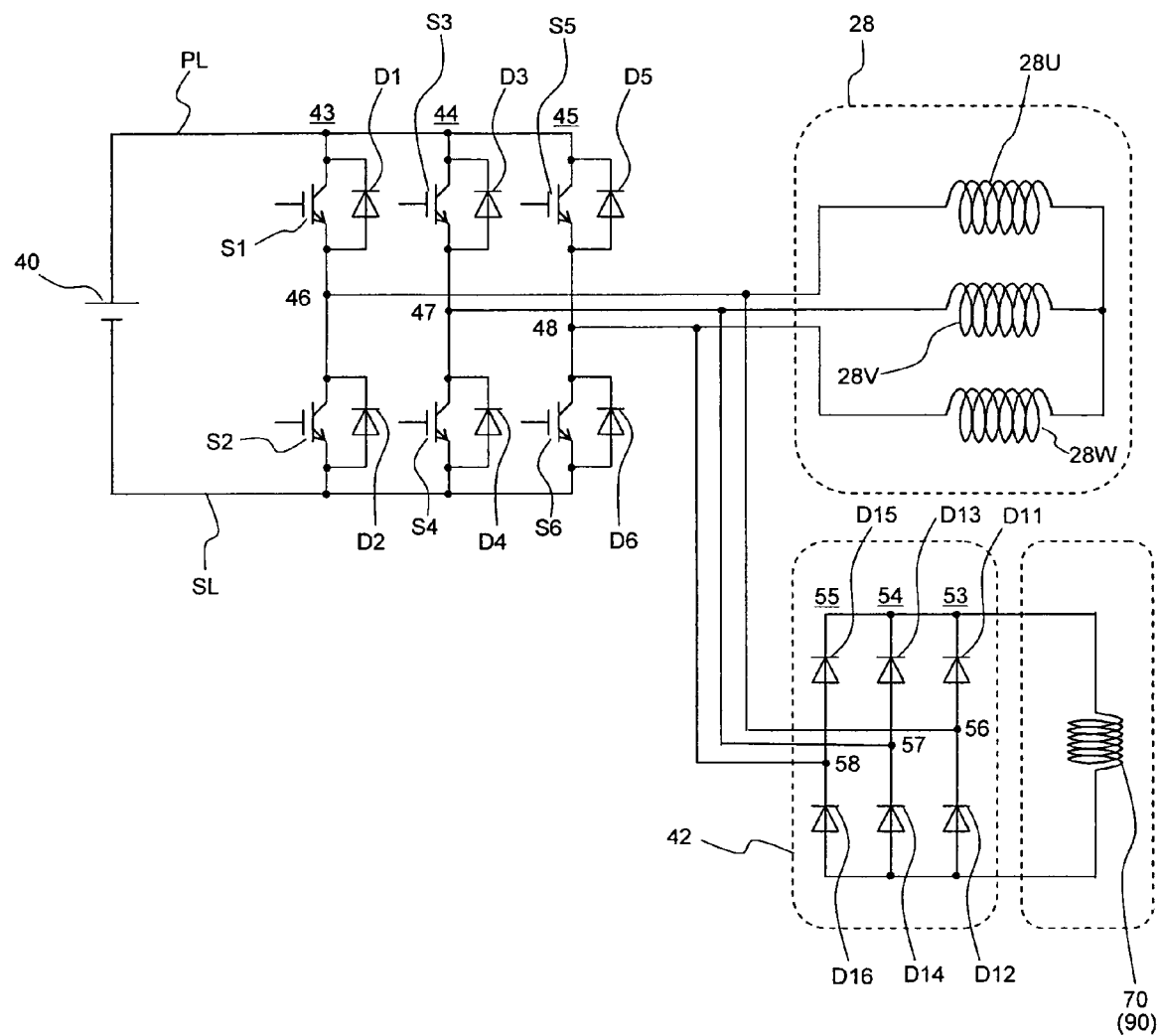
FIG. 12 is a diagram illustrating another schematic configuration of a drive unit for a rotating electrical machine according to an embodiment of the present invention.

In the present embodiment, as shown in FIG. 12, for example, configuration may be such that the rectifier circuit 42 is connected in parallel to the armature winding 28. In contrast to the configuration example shown in FIG. 10, in the configuration example shown in FIG. 12, one end of each phase 28U, 28V, 28W of the armature winding 28 is connected respectively to the midpoints 46, 47, 48 between switching elements of the corresponding switching arms 43, 44, 45 and at the same time connected to the midpoints 56, 57, 58 between diodes of the corresponding rectifier arms 53, 54, 55. The other ends of each phase 28U, 28V, 28W of the armature winding 28 are connected to each other. That is, the armature windings 28U, 28V, 28W of three phases are connected in a Y (star) connection. Also in the configuration example shown in FIG. 12, both the amount of the field current supplied to the field windings 70, 90 and the amount of the alternating current supplied to the armature winding 28 may be controlled while maintaining a proportional relationship therebetween, by merely implementing switching control of the inverter 41.

Figure 13:
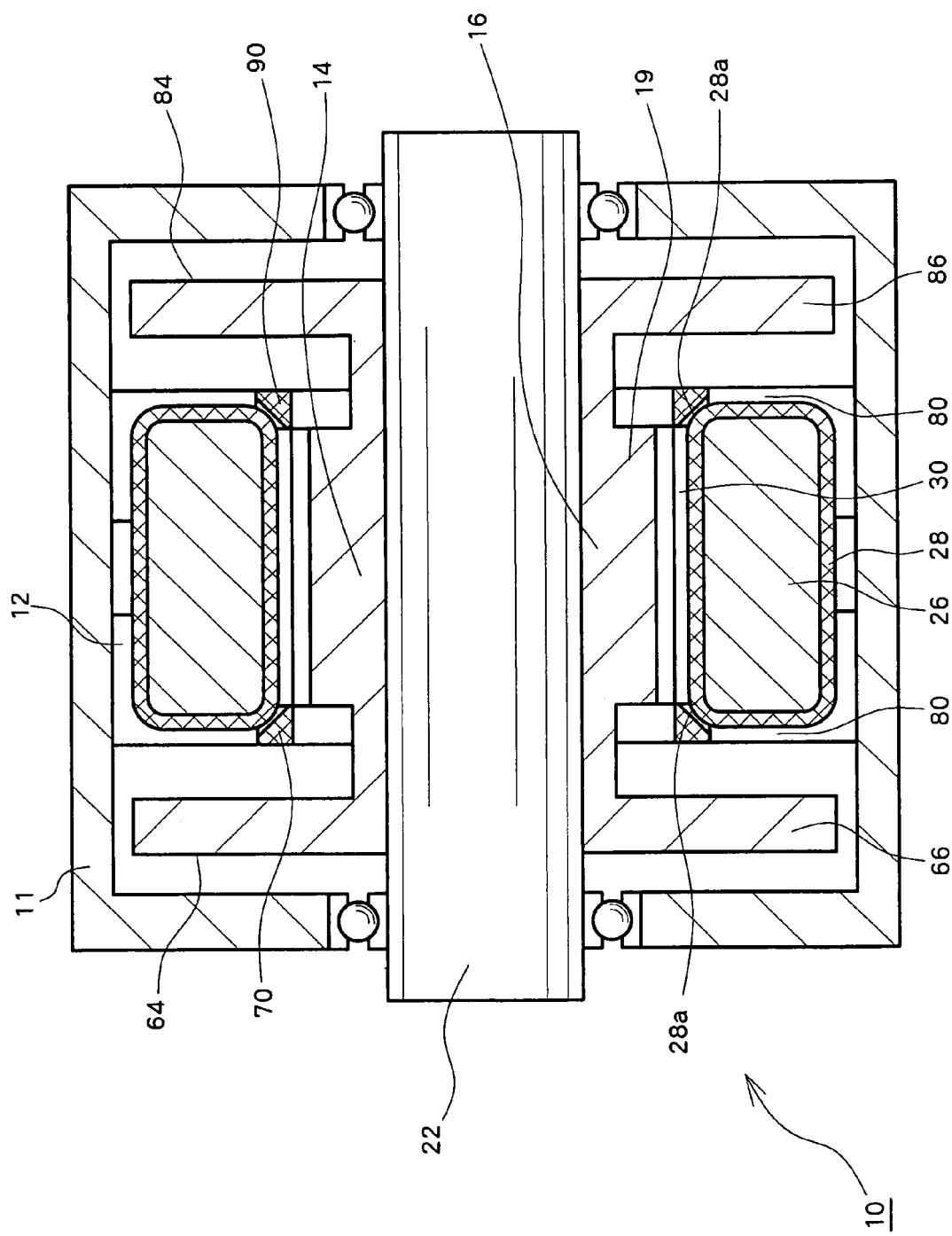
FIG. 13 is a diagram illustrating another example of configuration of a rotating electrical machine.
Figure 14:
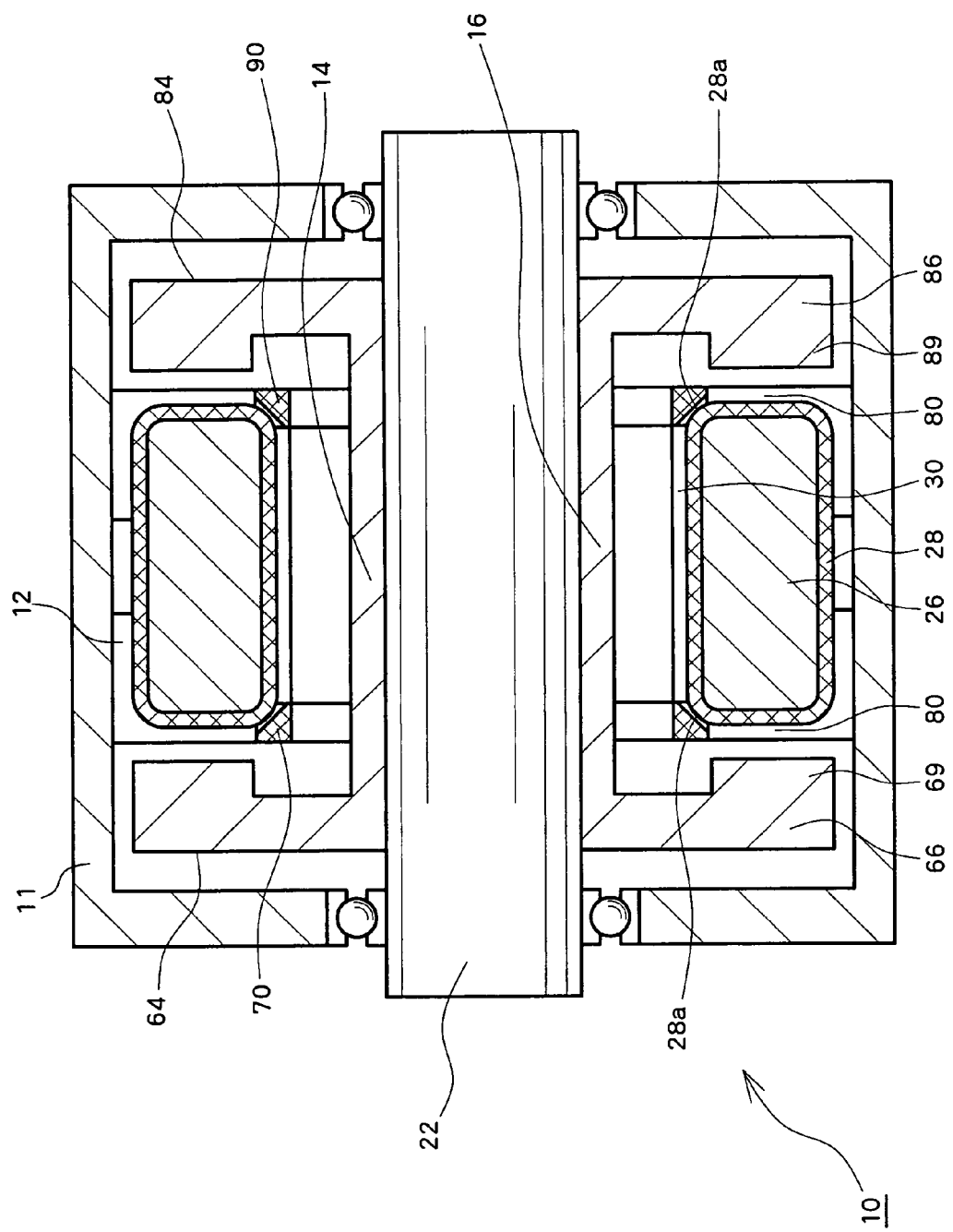
FIG. 14 is a diagram illustrating another example of configuration of a rotating electrical machine.
Figure 15:
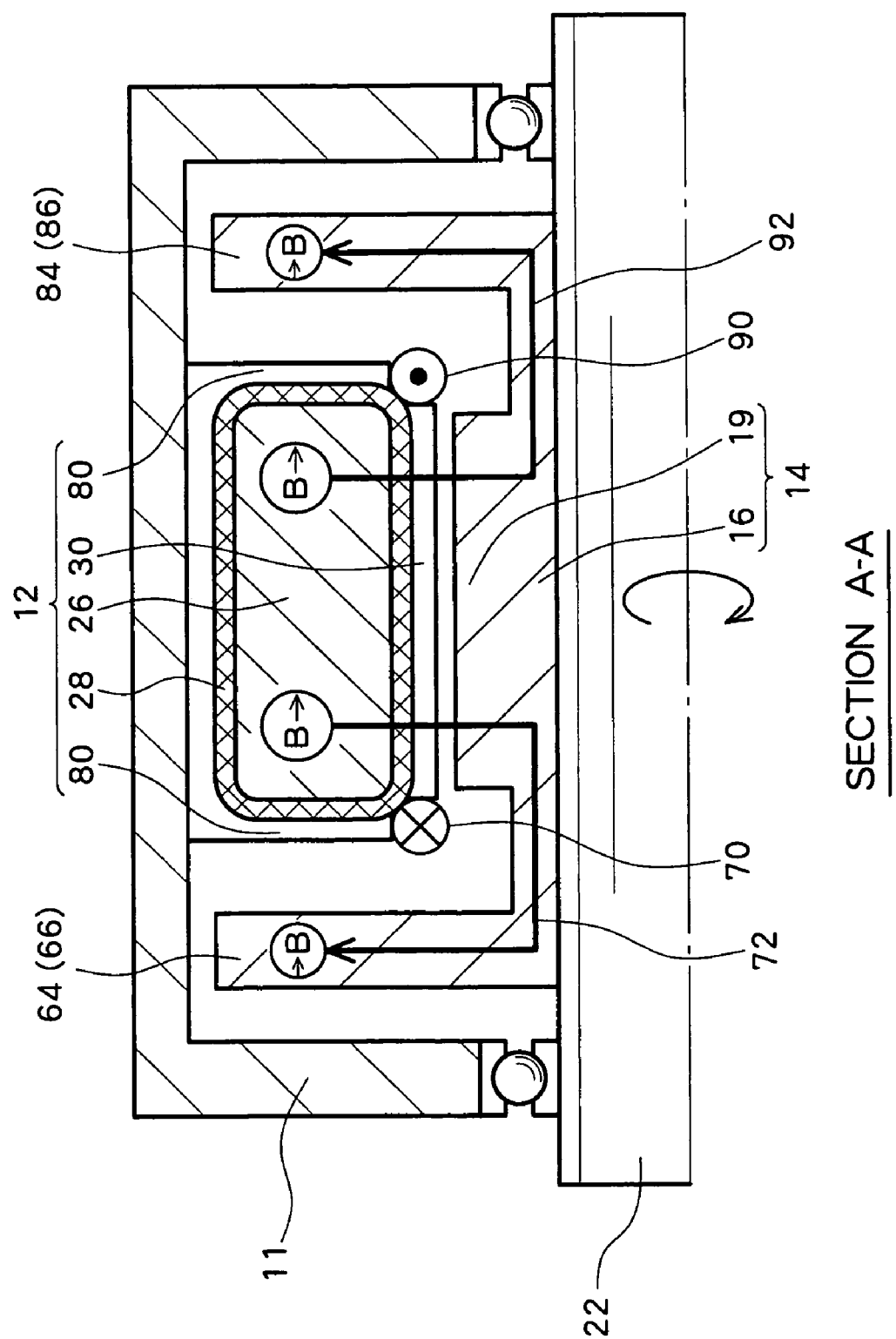
FIG. 15 is a diagram explaining the field control in a rotating electrical machine.
Figure 16:
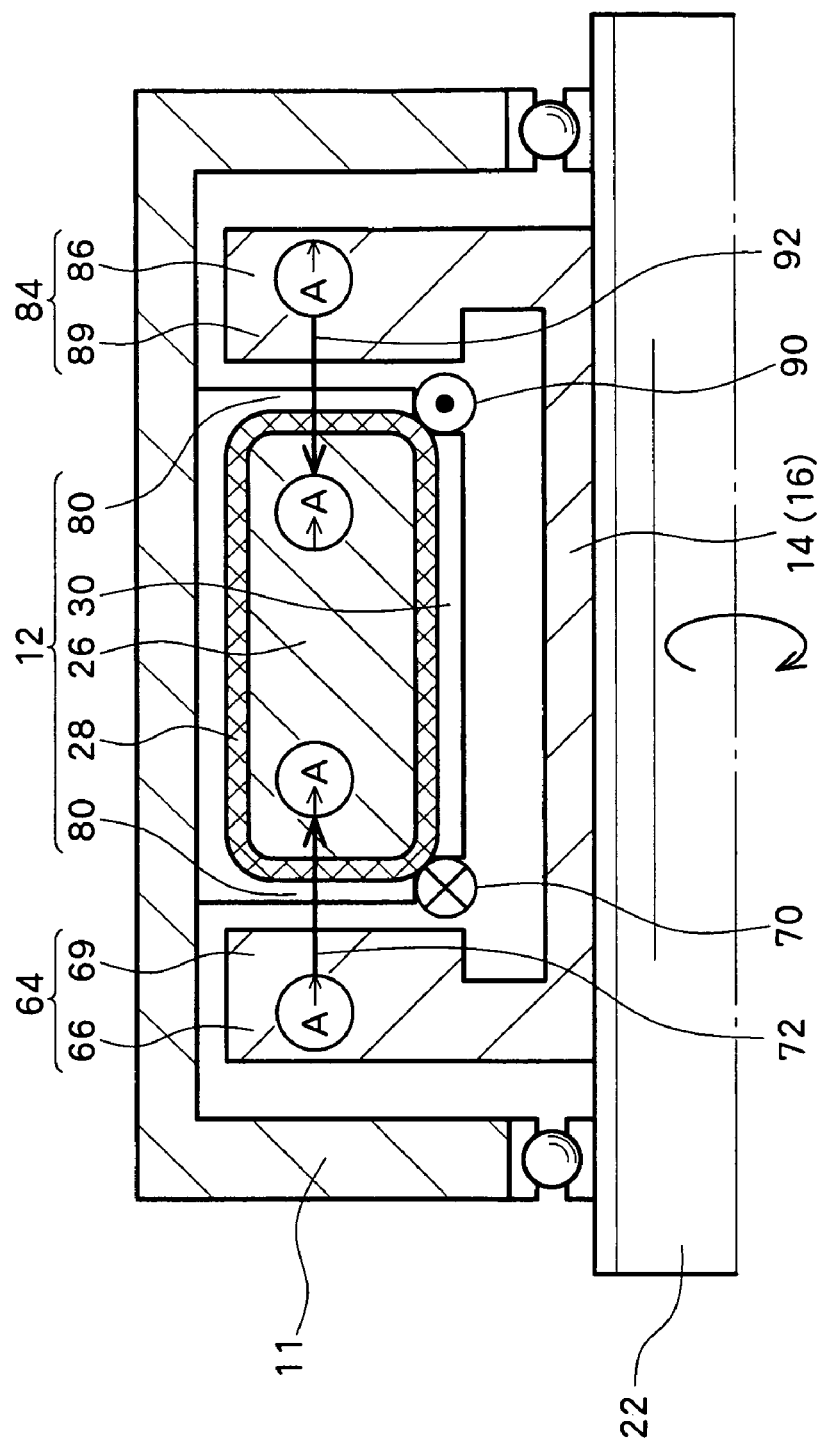
FIG. 16 is a diagram explaining the field control in a rotating electrical machine.

Further, in the rotating electrical machine 10, as shown in FIGS. 13 and 14, for example, the radial permanent magnet 18 and the axial permanent magnets 68, 88 may be omitted. In this case as well, as shown in FIGS. 15 and 16, for example, field fluxes 72, 92 that pass through a closed magnetic path formed by the radial salient pole portion 19, the radial core 16, the axial cores 66, 86, the axial salient pole portions 69, 89, an air gap, the axial teeth 80, the annular core portion 26, the radial teeth 30, an air gap, and the radial salient pole portion 19 are generated by supplying field current (direct current) to the field windings 70, 90 from the rectifier circuit 42. These field fluxes 72, 92 interact with a rotating field that is generated in the stator 12 by supplying an alternating current to the armature winding 28 from the inverter 41. At that time also, the surface of each axial salient pole portion 69, 89 is magnetized to an opposite polarity to that of the surface of each radial salient pole portion 19. Also in the configuration examples shown in FIGS. 13 and 14, the switching control of the inverter 41 implemented so as to increase the amount of field current supplied to the field windings 70, 90 increases the field flux linked to the armature winding 28, and therefore it becomes possible to implement the field strengthening control. On the other hand, by implementing switching control of the inverter 41 so as to decrease the amount of the field current supplied to the field windings 70, 90, the field flux linked to the armature winding 28 may be reduced, and it therefore becomes possible to implement the field weakening control. Also, in the rotating electrical machine 10, either one of the field windings 70, 90 may be omitted.

Figure 19:
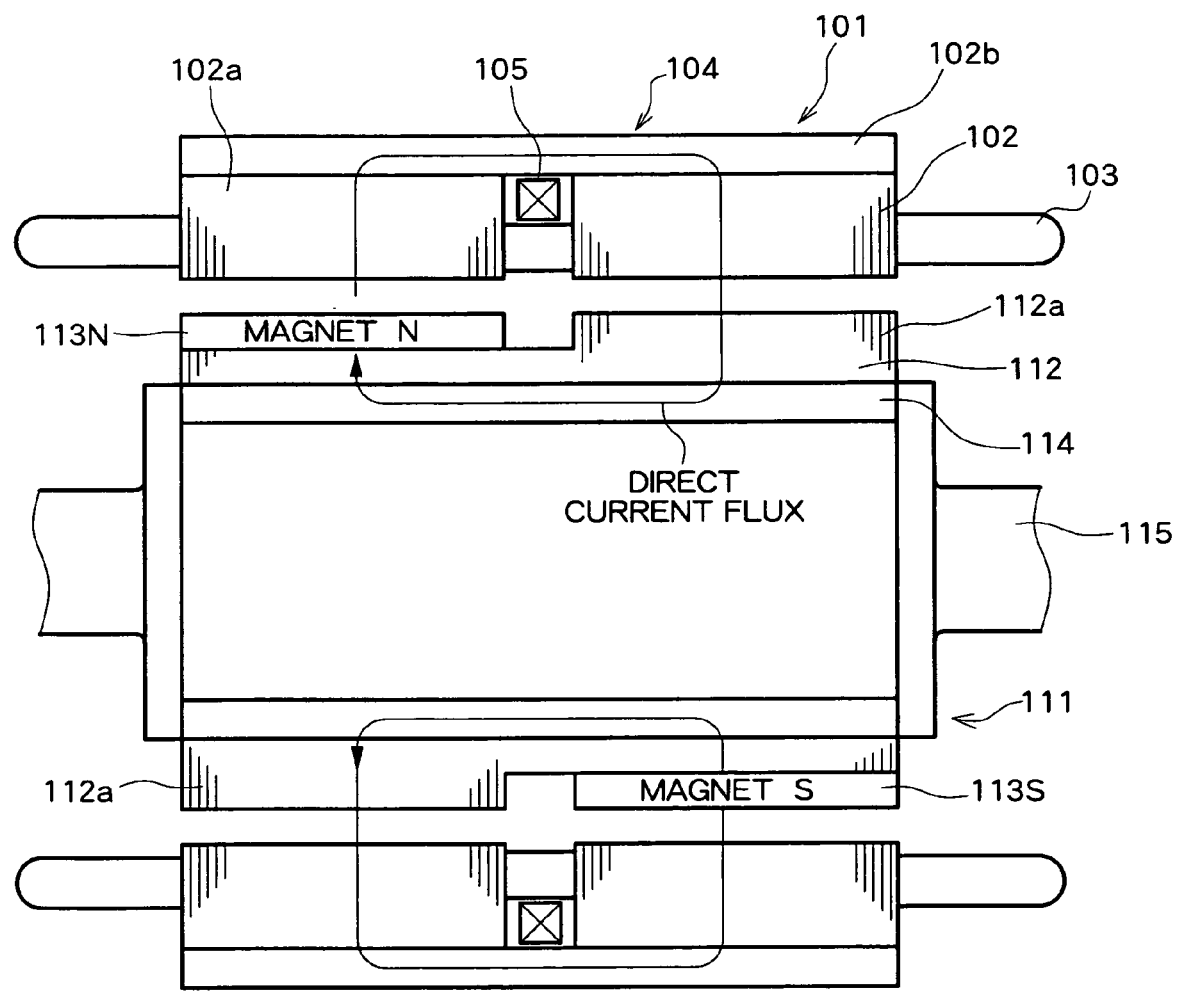
FIG. 19 is a diagram showing another example of configuration of a rotating electrical machine.
Figure 20:
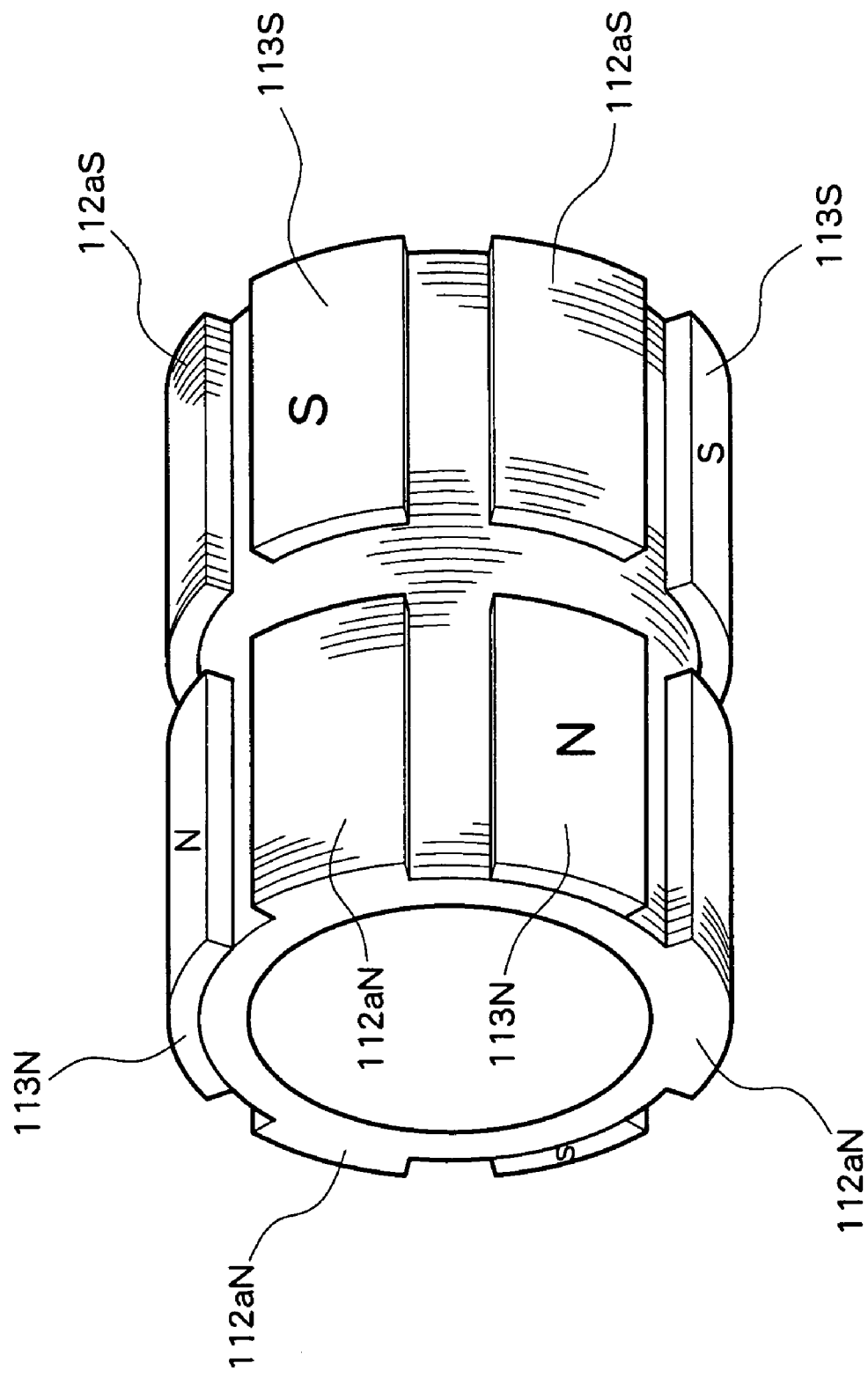
FIG. 20 is a diagram illustrating another example of configuration of a rotating electrical machine.
Figure 21:
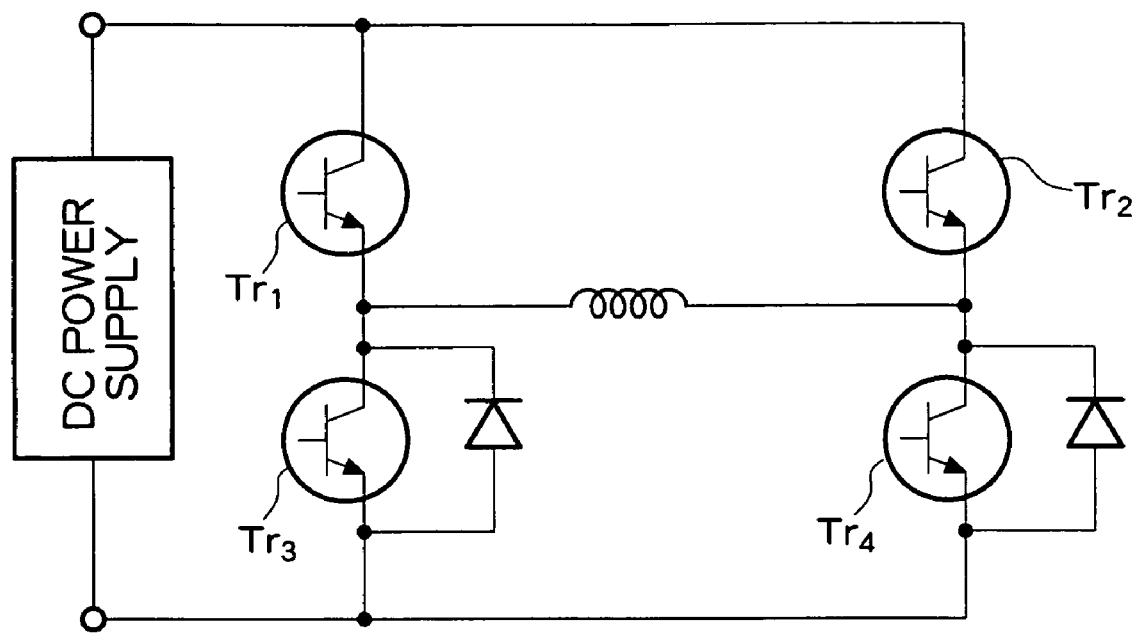
FIG. 21 is a diagram illustrating a schematic configuration of a drive unit for a rotating electrical machine according to a related art.

Further, the drive unit for a rotating electrical machine according to the present embodiment is also applicable in the case where current is supplied to the field winding 105 and the armature winding 103 of a rotating electrical machine in the patent document 1 shown in FIGS. 19 and 20. In that case, by supplying a direct current to the field winding 105 from the rectifier circuit 42 such that the field flux generated by the field winding 105 becomes opposite to that of the field flux generated by the permanent magnets 113N, 113S, torque of a rotor can be increased when the rotational speed of the rotor is low and the induction voltage of the armature winding 103 can be reduced when the rotational speed of the rotor is high. Further, the drive unit for a rotating electrical machine according to the present embodiment is applicable to a construction where the permanent magnets 113N, 113S are omitted from the rotating electrical machine shown in FIGS. 19 and 20. In addition, the drive unit for a rotating electrical machine according to the present embodiment is also applicable to the case where current is supplied to the field winding and the armature winding of a rotating electrical machine in the JP 2008-187826 A.

Figure 17:
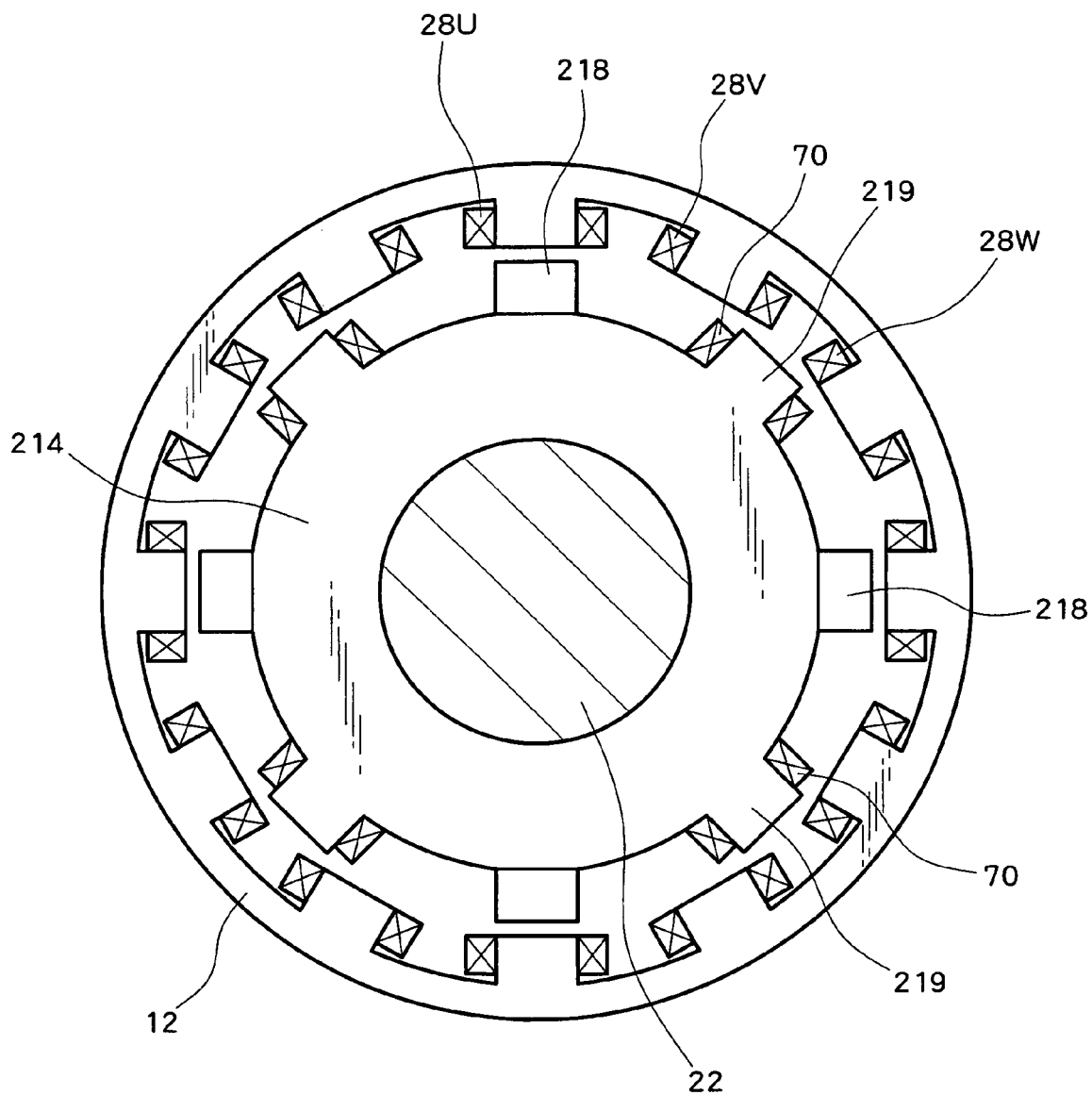
FIG. 17 is a diagram showing another example of configuration of the rotating electrical machine.

The drive unit for a rotating electrical machine according to the present embodiment is also applicable to the rotating electrical machine 10 in which a field winding 70 is provided on a rotor 214, as shown in FIG. 17, for example. In the configuration example shown in FIG. 17, the armature windings 28U, 28V, 28W of three phases are provided on the stator 12 (stator core). On the outer peripheral portion of the rotor 214 (rotor core), a plurality of permanent magnets 218 and a plurality of salient pole portions 219 (in the quantity equivalent to the number of permanent magnets 218) protruding radially outward toward the stator 12 are arranged at intervals (at equal intervals) along the circumferential direction. A plurality of permanent magnets 218 are arranged at positions between each of the salient pole portions 219 in the circumferential direction. That is, each permanent magnet 218 is displaced in the circumferential direction with respect to the salient pole portion 219 and the permanent magnets 218 and the salient pole portions 219 are alternately arranged in the circumferential direction. A field winding 70 is provided on each salient pole portion 219, and a direct current is supplied to the field winding 70 from a rectifier circuit 42 via a slip ring, to generate a field flux. This field flux then interacts with a rotating magnetic field generated in the stator 12 by supplying an alternating current to the armature windings 28U, 28V, 28W from the inverter 41. At that time, a direct current (field current) is supplied to the field winding 70 in a direction such that the surface (magnetic surface opposing the stator 12) of each salient pole portion 219 is magnetized to the opposite polarity to that of the surface (magnetic surface opposing the stator 12) of each permanent magnet 218. Also in the configuration example shown in FIG. 17, it is possible to increase the field flux linked to the armature windings 28U, 28V, 28W by implementing switching control of the inverter 41 so as to increase the amount of field current supplied to the field winding 70, whereby it becomes possible to implement the field strengthening control. On the other hand, it is possible to decrease the field flux linked to the armature windings 28U, 28V, 28W by implementing switching control of the inverter 41 so as to reduce the amount of field current supplied to the field winding 70, whereby it becomes possible to implement the field weakening control. Further, in the configuration example shown in FIG. 17, salient portions provided with field windings may be provided instead of each permanent magnet 218.

As described heretofore, the drive unit for a rotating electrical machine according to the present embodiment is applicable to a rotating electrical machine which generates a field flux when a direct current is supplied to the field winding and which generates a magnetic field that interacts with the field flux when an alternating current is supplied to the armature winding.

Figure 18:
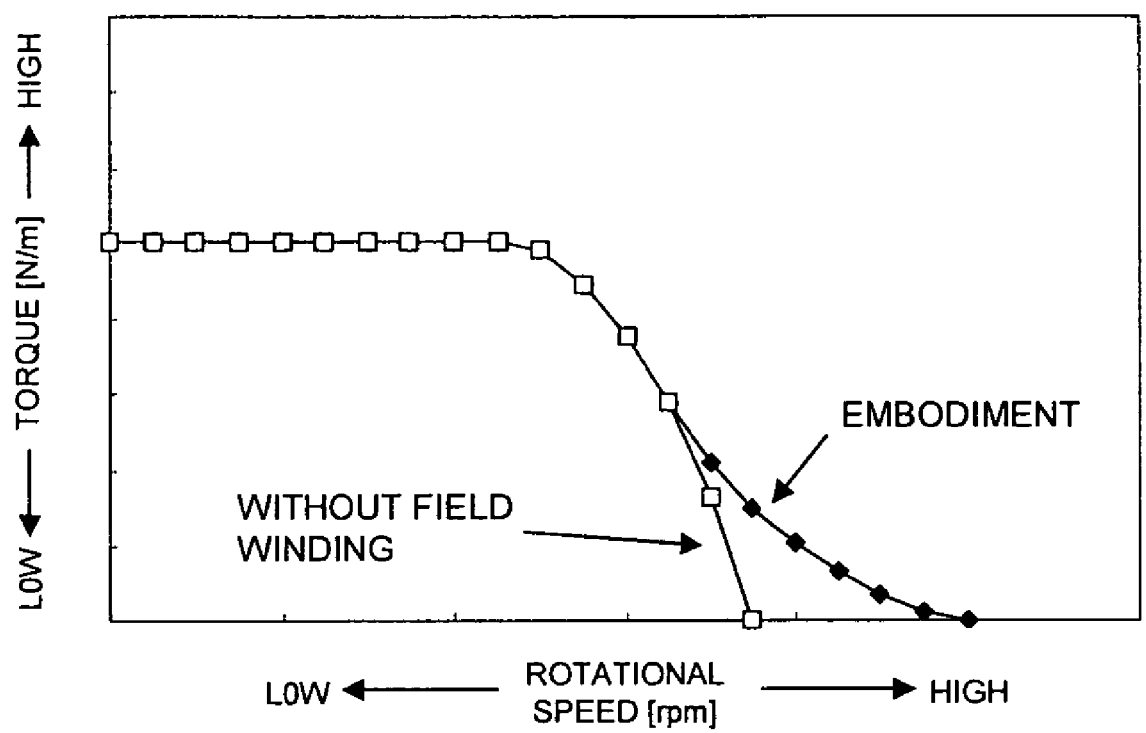
FIG. 18 is a diagram showing the result of simulation for calculating the relationship between rotational speed and torque of the rotating electrical machine.

FIG. 18 shows a simulation result of a relationship between the rotational speed and torque calculated based on an example wherein one half of the magnetic flux is compensated by a field flux created by the field current supplied to the field winding in surface magnet rotating electrical machine. In FIG. 18, "Without field winding" represents a simulation result of a case where the field flux is kept constant by only the magnetic flux $\phi a$ without the armature winding current (three-phase current), and "Embodiment" represents a simulation result of a case where the field flux is a sum of the magnetic flux $\frac{1}{2} \times \phi a$ and the magnetic flux $\phi i$ generated by the field current (however, $\phi i = \frac{1}{2} \times \phi a$ at a maximum current). As shown in FIG. 18, one can see that the operating range of the "Embodiment" may be expanded to the high-rotational speed side compared to "Without field winding." In the simulation, the field flux at the maximum field current of the "Embodiment" is made equal to that of the case with "Without field winding" such that the maximum torque does not change at low rotational speed. However, it is also possible to increase torque at low rotational speed by increasing the magnetic flux $\phi i$ generated by the field current.

While modes for carrying out the present invention has been described heretofore, the present invention is not limited thereto whatsoever, and it is obvious that the invention may be carried out in various modes without departing from the scope of the invention.

What is claimed is:

1. A drive unit for a rotating electrical machine for supplying electrical current to a field winding and a three-phase armature winding of a rotating electrical machine which generates a field flux when a direct current is supplied to the field winding and which generates a magnetic field that interacts with the field flux when an alternating current is supplied to the armature winding, comprising:
    an inverter adapted to convert a direct current from a direct current power supply and to supply the alternating current to the armature winding, the inverter comprising a plurality of switching arms provided corresponding to each phase of the armature winding, each of the plurality of switching arms including a pair of switching elements connected in series between a positive terminal and a negative terminal of the direct current power supply, and
    a rectifier circuit capable of rectifying the current that has been converted into alternating current by the inverter into a direct current and supplying the direct current to the field winding, the rectifier circuit comprising a plurality of rectifier arms provided corresponding to each phase of the armature winding, each of the plurality of rectifier arms including a pair of rectifier devices connected in series between one end and the other end of the field winding, and
    the one end of each phase of the armature winding is connected to a midpoint of switching elements of a corresponding switching arm, and the other end of each phase of the armature winding is connected to a midpoint between rectifier devices of a corresponding rectifier arm.

2. A drive unit for a rotating electrical machine for supplying electrical current to a field winding and a three-phase armature winding of a rotating electrical machine which generates a field flux when a direct current is supplied to the field winding and which generates a magnetic field that interacts with the field flux when an alternating current is supplied to the armature winding, comprising:
    an inverter adapted to convert a direct current from a direct current power supply and supplying the alternating current to the armature winding, the inverter comprising a plurality of switching arms provided corresponding to each phase of the armature winding, each of the plurality of switching arms including a pair of switching elements connected in series between a positive terminal and a negative terminal of the direct current power supply, and
    a rectifier circuit capable of rectifying the current that has been converted into alternating current by the inverter into a direct current and supplying the direct current to the field winding,
    the rectifier circuit comprising a plurality of rectifier arms provided corresponding to each phase of the armature winding, each of the plurality of rectifier arms including a pair of rectifier devices connected in series between one end and the other end of the field winding, and
    the one end of each phase of the armature winding is connected to a midpoint of switching elements of a corresponding switching arm and to a midpoint of rectifier devices of a corresponding rectifier arm, and the other ends of each phase of the armature winding are connected to each other.

3. The drive unit for a rotating electrical machine according claim 1,
    wherein the rectifier circuit rectifies an alternating current, that has been converted by the inverter, into a direct current and supplies it to the field windings provided at a stator of a rotating electrical machine.

4. The drive unit for a rotating electrical machine according claim 2,
    wherein the rectifier circuit rectifies an alternating current, that has been converted by the inverter, into a direct current and supplies it to the field windings provided at a stator of a rotating electrical machine.

* * * * *